(12) United States Patent
Kim et al.

(10) Patent No.: US 10,928,442 B2
(45) Date of Patent: Feb. 23, 2021

(54) COMPUTER IMPLEMENTED METHODS AND COMPUTING SYSTEMS FOR DESIGNING INTEGRATED CIRCUITS BY CONSIDERING BACK-END-OF-LINE

(71) Applicant: Samsung Electronics Co., Ltd., Suwon-si (KR)

(72) Inventors: Tae-il Kim, Goyang-si (KR); Jae-hoon Kim, Seoul (KR); Hyung-ock Kim, Seoul (KR); Jung-yun Choi, Suwon-si (KR)

(73) Assignee: Samsung Electronics Co., Ltd.

( * ) Notice: Subject to any disclaimer, the term of this patent is extended or adjusted under 35 U.S.C. 154(b) by 300 days.

(21) Appl. No.: 15/842,184

(22) Filed: Dec. 14, 2017

(65) Prior Publication Data

US 2018/0231604 A1     Aug. 16, 2018

(30) Foreign Application Priority Data

Feb. 10, 2017   (KR) ........................ 10-2017-0018764

(51) Int. Cl.

| | |
|---|---|
| *G01R 31/28* | (2006.01) |
| *G06F 30/34* | (2020.01) |
| *G06F 30/327* | (2020.01) |
| *G06F 30/392* | (2020.01) |
| *G06F 30/398* | (2020.01) |
| *G06F 30/394* | (2020.01) |
| *G06F 119/12* | (2020.01) |

(52) U.S. Cl.
CPC ....... *G01R 31/2851* (2013.01); *G06F 30/327* (2020.01); *G06F 30/34* (2020.01); *G06F 30/392* (2020.01); *G06F 30/398* (2020.01); *G06F 30/394* (2020.01); *G06F 2119/12* (2020.01)

(58) Field of Classification Search
CPC ... G01R 31/2851; G06F 30/34; G06F 30/327; G06F 30/392; G06F 30/398; G06F 30/394; G06F 2119/12; G06F 30/39
See application file for complete search history.

(56) References Cited

U.S. PATENT DOCUMENTS 6,026,219 A  *  2/2000  Miller .................... G06F 30/30
                                                         703/23
6,973,632 B1     12/2005  Brahme et al.
(Continued)

FOREIGN PATENT DOCUMENTS

JP        2016-110408         6/2016

*Primary Examiner* — Nha T Nguyen
(74) *Attorney, Agent, or Firm* — Myers Bigel, P.A.

(57) ABSTRACT

Computer implemented methods of designing integrated circuits and computing systems are provided. A computer implemented method of designing an integrated circuit according to the inventive concepts may be performed by a processor and may include performing a placement and routing (P&R) operation for standard cells defining the integrated circuit, extracting characteristic values from a result of the P&R operation, generating a physical-aware annotation file by determining a plurality of representative characteristic values that respectively correspond to a plurality of groups based on the extracted characteristic values, and performing a physical-aware synthesis operation to generate a netlist from input data for the integrated circuit, based on the generated physical-aware annotation file.

15 Claims, 19 Drawing Sheets

(56) References Cited

U.S. PATENT DOCUMENTS

| | | | |
|---|---|---|---|
| 7,207,020 B1* | 4/2007 | Fung | G06F 30/34 |
| | | | 716/113 |
| 7,257,782 B2* | 8/2007 | Ho | G06F 30/392 |
| | | | 716/113 |
| 7,546,567 B2* | 6/2009 | Cheon | G06F 30/394 |
| | | | 716/113 |
| 7,761,832 B2 | 7/2010 | Alpert et al. | |
| 7,853,915 B2 | 12/2010 | Saxena et al. | |
| 8,091,057 B1* | 1/2012 | Suthar | G06F 30/3312 |
| | | | 716/113 |
| 8,196,081 B1* | 6/2012 | Arslan | G06F 30/394 |
| | | | 716/126 |
| 8,261,218 B1* | 9/2012 | Fung | G06F 30/34 |
| | | | 716/108 |
| 8,527,925 B2* | 9/2013 | Dai | G06F 30/39 |
| | | | 716/108 |
| 8,539,413 B1* | 9/2013 | Singla | G06F 30/3312 |
| | | | 716/113 |
| 8,560,984 B1 | 10/2013 | Song et al. | |
| 8,719,743 B1* | 5/2014 | Kollaritsch | G06F 30/3312 |
| | | | 716/104 |
| 8,793,630 B2* | 7/2014 | Ge | G06F 30/39 |
| | | | 716/108 |
| 8,843,872 B1* | 9/2014 | Chang | G06F 30/327 |
| | | | 716/132 |
| 8,856,702 B1 | 10/2014 | Singh et al. | |
| 8,875,075 B2 | 10/2014 | Kennedy et al. | |
| 8,887,117 B1* | 11/2014 | Chuang | G06F 30/3312 |
| | | | 716/124 |
| 9,443,048 B2 | 9/2016 | Berry et al. | |
| 9,483,597 B1* | 11/2016 | Das | G06F 30/394 |
| 9,773,083 B1* | 9/2017 | Das | G06F 30/394 |
| 10,338,633 B2* | 7/2019 | Liu | G06F 30/392 |
| 2002/0162086 A1* | 10/2002 | Morgan | G06F 30/30 |
| | | | 716/102 |
| 2004/0153278 A1 | 8/2004 | Zhang et al. | |
| 2005/0034091 A1* | 2/2005 | Harn | G06F 30/392 |
| | | | 716/113 |
| 2006/0107244 A1* | 5/2006 | Yonezawa | G06F 30/30 |
| | | | 716/113 |
| 2008/0216038 A1* | 9/2008 | Bose | G06F 30/392 |
| | | | 716/118 |
| 2008/0216040 A1* | 9/2008 | Furnish | G06F 30/392 |
| | | | 716/122 |
| 2010/0153896 A1* | 6/2010 | Sewall | G06F 30/3312 |
| | | | 716/113 |
| 2011/0066990 A1* | 3/2011 | Ono | G06F 30/3312 |
| | | | 716/108 |
| 2012/0284680 A1* | 11/2012 | Iyer | G06F 30/3312 |
| | | | 716/113 |
| 2015/0213186 A1* | 7/2015 | Le Bars | G06F 30/398 |
| | | | 716/114 |

* cited by examiner

| | MAXIMUM CLOCK LATENCY | MINIMUM CLOCK LATENCY |
|---|---|---|
| CP1 | CL1_max | CL1_min |
| CP2 | CL2_max | CL2_min |
| CP3 | CL3_max | CL3_min |
| ... | ... | ... |

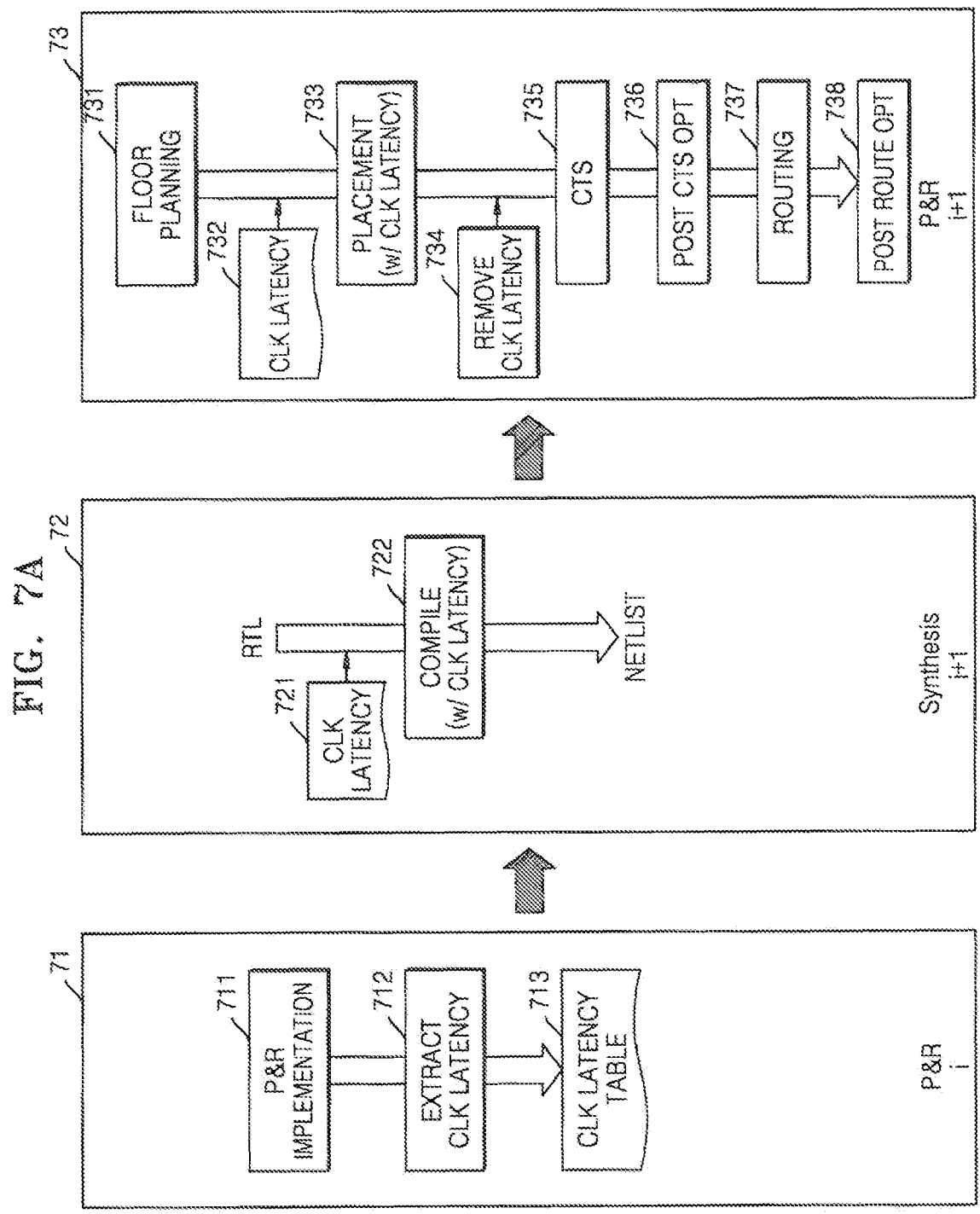

FIG. 8

| | MAXIMUM CLOCK LATENCY | MINIMUM CLOCK LATENCY |
|---|---|---|
| REF | CL_max | CL_min |
| LMG1 | CL_M1_max | CL_M1_min |
| LMG2 | CL_M2_max | CL_M2_min |
| LMG3 | CL_M3_max | CL_M3_min |
| .. | .. | ... |

FIG. 13A

R Scaling Factor Table 131

| Length | L1 | L2 | L3 | L4 |
|---|---|---|---|---|
| FO=1 | R11 | R12 | R13 | R14 |
| FO=2 | R21 | R22 | R23 | R24 |
| FO=3 | R31 | R32 | R33 | R34 |
| ... | ... | ... | ... | ... |

FIG. 13B

C Scaling Factor Table 132

| Length | L1 | L2 | L3 | L4 |
|---|---|---|---|---|
| FO=1 | C11 | C12 | C13 | C14 |
| FO=2 | C21 | C22 | C23 | C24 |
| FO=3 | C31 | C32 | C33 | C34 |
| ... | ... | ... | ... | ... | ved # COMPUTER IMPLEMENTED METHODS AND COMPUTING SYSTEMS FOR DESIGNING INTEGRATED CIRCUITS BY CONSIDERING BACK-END-OF-LINE

REFERENCE TO PRIORITY APPLICATION

This application claims priority under 35 U.S.C. § 119 to Korean Patent Application No. 10-2017-0018764, filed Feb. 10, 2017 in the Korean Intellectual Property Office, the contents of which are hereby incorporated by reference herein in their entirety.

BACKGROUND

Embodiments of the inventive concepts relate to integrated circuits, and more particularly, to computer implemented methods and computing systems for designing integrated circuits.

An integrated circuit may be designed based on standard cells. Specifically, the standard cells may be placed according to data defining the integrated circuit, and the placed standard cells may be routed to generate a layout of the integrated circuit. As a manufacturing process of a semiconductor becomes micronized, a size of patterns in a standard cell and a size of the standard cell itself may be reduced. In this regard, routing congestion and metal resistance may increase, and thus, the importance of an effect related to BEOL is increasing in the design of integrated circuits.

SUMMARY

Some embodiments of the inventive concepts may provide computer implemented methods and computing systems for designing integrated circuit by considering Back-End-Of-Line (BEOL).

According to some embodiments of the inventive concepts, computer implemented methods of designing integrated circuits including logic modules may be provided. A method may be performed by a processor. The method may include performing a placement and routing (P&R) operation for standard cells defining the integrated circuit, extracting characteristic values from a result of the P&R operation, generating a physical-aware annotation file by determining a plurality of representative characteristic values that respectively correspond to a plurality of groups of the logic modules based on the extracted characteristic values, and performing, a physical-aware synthesis operation to generate a netlist from input data for the integrated circuit based on the generated physical-aware annotation file.

According to some embodiments of the inventive concepts, computer implemented method of designing integrated circuits may be provided. A method may be performed by a processor. The method may include performing a first placement and routing (P&R) operation for a plurality of standard cells defining the integrated circuit, extracting at least one of clock, latency information and parasitic component information from a result of the first P&R operation, performing a physical-aware synthesis operation to generate a netlist from input data for the integrated circuit, based on the extracted at least one of clock latency information and parasitic component information, and performing a second P&R operation for the plurality of standard cells defining the integrated circuit according to the generated netlist.

According to some embodiments of the inventive concepts, computer implemented methods of designing integrated circuits may be provided. A method may be performed by a processor. The method may include performing a first P&R operation based on a netlist for the integrated circuit, and extracting clock latency information from a result of the first P&R operation, and performing a second P&R operation based on the netlist and the clock latency information, wherein the performing of the second P&R operation includes placing a plurality of standard cells defining the integrated circuit, based on the extracted clock latency information.

According to some embodiments of the inventive concepts, computer implemented methods of designing integrated circuits may be provided. A method may be performed by a processor. The method may include performing a first P&R operation to place a first plurality of standard, cells defining the integrated circuit, extracting clock latency information from a result of the first P&R operation, and performing a second P&R operation to place a second plurality of standard cells defining the integrated circuit based on the clock latency information.

BRIEF DESCRIPTION OF THE DRAWINGS

The inventive concepts will be more clearly understood in view of the detailed description and the accompanying drawings.

FIG. 7A is a flowchart illustrating operations of the designing method of FIG. 3, according to some embodiments of the inventive concepts.

FIG. 8 is a table of minimum and maximum clock latencies according to some embodiments of the inventive concepts.

FIG. 13A is a table of parasitic resistance scaling factors according to some embodiments of the inventive concepts, and FIG. 13B is a table of parasitic capacitance scaling factors according to some embodiments of the inventive concepts.

DETAILED DESCRIPTION OF THE EMBODIMENTS

Figure 1:
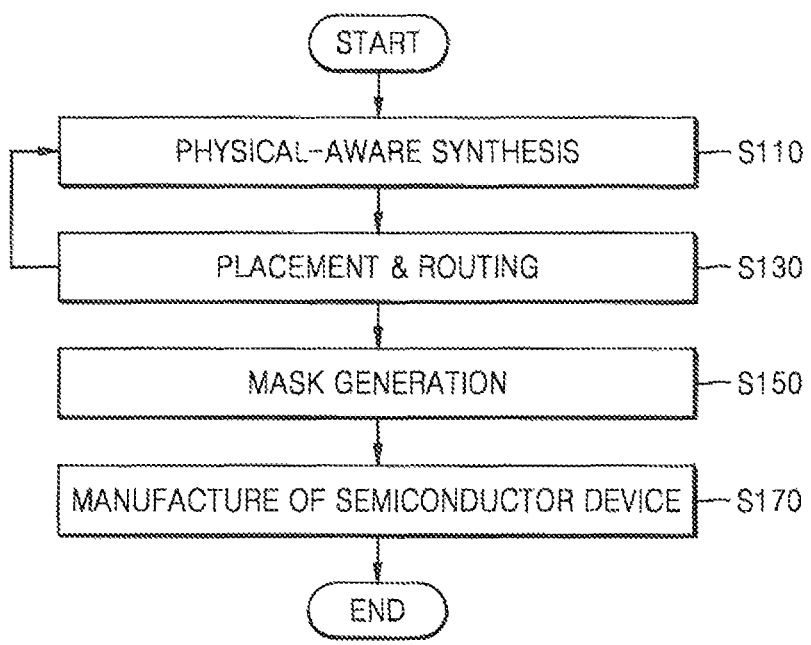
FIG. 1 is a flowchart Illustrating operations of methods of manufacturing semiconductor devices according to some embodiments of the inventive concepts.

FIG. 1 is a flowchart illustrating methods of manufacturing semiconductor devices according to some embodiments of the inventive concepts.

Referring to FIG. 1, a method of manufacturing a semiconductor device may be divided into a process of designing integrated circuit and a manufacturing process of the integrated circuit. The designing of the integrated circuit may include operations S110 and S130 for designing a layout of the integrated circuit and may be performed using a tool for designing the integrated circuit. The tool for designing the integrated circuit may be a program including a plurality of instructions executed by a processor. Accordingly, the method of designing the integrated circuit may be referred to as a computer Implemented method for designing an integrated circuit. The manufacturing process of the integrated circuit may include operations S150 and S170 and may be performed in a semiconductor process module when manufacturing a semiconductor device including the integrated circuit based on layout data.

In the operation S110, a physical-aware synthesis operation may be performed. For example, the operation S110 may be performed by a processor using a synthesis tool. For example, the synthesis tool may include programmable code that, when executed by the processor, may perform the physical-aware synthesis operation. The programmable code may be stored in a non-volatile memory device. "Synthesis," as used herein, may refer to an operation to generate a netlist, whereby input data for an integrated circuit is converted into a hardware form consisting of logic gates, and the operation may be referred to as "logic synthesis." The input data may be an abstract form with respect to a behavior of an integrated circuit, for example, data defined by a Register Transfer Level (RTL). The netlist may be generated from an RTL code using a standard cell library and may be a gate-level netlist.

An integrated circuit may include a plurality of clock paths and a plurality of data paths. In a synthesis operation, a clock path may be generated according to an ideal clock signal, and a data path may be generated using global routing. In a placement and routing (P&R) operation, a clock path may be generated according to a delayed clock signal, and a data path may be generated using detail routing. In this regard, there may be a miscorrelation between the clock path generated in the synthesis operation and the clock path generated in the P&R operation, and there may be a miscorrelation between the data path generated in the synthesis operation and the data path generated in the P&R operation.

In the operation S110, a physical-aware synthesis operation may be performed using characteristic values extracted from a result of previous P&R operations to consider an effect of Back-End-Of-Line (BEOL). Accordingly, a difference between the clock path generated in the synthesis operation and the clock path generated in the P&R operation may be reduced, and a difference between the data path generated in the synthesis operation and the data path generated in the P&R operation may be reduced. In some embodiments, the extracted characteristic values and the RTL code may be provided to a synthesis, tool as input files, and a gate-level netlist may be output from the synthesis tool as an output file. However, the inventive concepts are not limited thereto, and in some embodiments, representative characteristic values and/or a physical-aware annotation file may be input to a synthesis tool as an input file.

In some embodiments, the extracted characteristic values may include clock latency information. The clock latency information may include a clock latency on each of a plurality of clock paths, and the operation S110 may be performed using the clock latency information. The physical-aware synthesis operation may be referred to as a Clock Tree Synthesis (CTS)-aware synthesis operation. Thus, even when CTS is not performed in operation S110, the clock path generated in operation S110 may be optimized with respect to BEOL.

In some embodiments, the extracted characteristic values may include parasitic component information. The parasitic component information may include parasitic resistances or parasitic capacitances for each of a plurality of data paths (i.e., a plurality of physical signal nets), and detail routing-aware synthesis may be performed using the parasitic component information. Thus, even when detail routing is not performed in operation S110, the data path generated in operation S110 may be optimized to BEOL.

In operation S130, a P&R operation may be performed. For example, operation S130 may be performed by a processor using a P&R tool. For example, the P&R tool may include programmable code that, when executed by the processor, may perform the P&R operation. The programmable code may be stored in a non-volatile memory device. In the P&R operation, standard cells defining an integrated circuit may be placed according to a netlist, and then, nets included in the placed standard cells may be routed to generate layout data for the integrated circuit. According to some embodiments, the netlist may be provided to the P&R tool as an input file, and the layout data and characteristic values may be output from the P&R tool as output files. However, the inventive concepts are not limited thereto, and in some embodiments, representative characteristic values and/or a physical-aware annotation file may be output from the P&R tool as an output file.

In some embodiments, characteristic values may be extracted as a result of the P&R operation, and the extracted characteristic values may be provided to a synthesis tool. For example, the extracted characteristic values may be output as a clock latency annotation file and/or a parasitic component annotation file and may be provided to the synthesis tool. Thus, characteristic values extracted from a result of a previous P&R operation may be used in a current synthesis operation, and characteristic values extracted From a result of the current P&R operation may be used in a next synthesis operation.

In a synthesis operation, since hierarchical optimization, such as architecture optimization and logic optimization, may be performed, a netlist may be easily changed, but since CTS and detail routing may be not performed, timing may be hard to precisely predict, so that it may be hard to obtain an optimum synthesis result. Otherwise, in a P&R operation, since only cell sizing, threshold voltage swapping, buffer insertion, or the like may be possible, it may be limited to change a netlist, but since CTS and detail routing may be performed, timing may be predicted more precisely than the synthesis operation.

Physical-aware synthesis may be performed using characteristic values extracted from a result of the previous P&R operation. Thus, the physical-aware synthesis may have precise physical information, so that time may be predicted more precisely than in the case of a conventional synthesis operation. As a result, a more optimum synthesis result, i.e., a more optimum netlist, may be obtained. Accordingly, in a subsequent P&R operation, a timing closure may be easily performed to improve a design Quality of Result (QoR) and reduce, a Turn Around Time (TAT).

In an operation S150, a mask may be generated based on the layout data. Specifically, an Optical Proximity Correction (OPC) process may be first performed based on the layout data. As used herein, OPC may refer to a process in which a layout is changed considering an error due to an optical proximity effect. Then, a mask may be generated according to a layout changed as a result of the OPC performance. The mask may be generated using the layout reflecting the OPC, for example. Graphic Data System (GDS) II, to which the OPC is applied.

In an operation S170, a semiconductor device in which an integrated circuit is embodied may be manufactured using the mask. Specifically, various semiconductor processes may be performed on a semiconductor substrate, such as a wafer, using a plurality of masks to manufacture a semiconductor device including the integrated circuit. For example, a process using the mask may include a patterning process using a lithography process. A desired pattern may be formed on a semiconductor substrate or a material layer using the patterning process. The semiconductor process may include one or more of a deposition process, an etching process, an ion process, and/or a cleaning process. Also, the semiconductor process may include a packing process in which a semiconductor device may be mounted on a printed circuit board (PCB) and be sealed with a sealing material, and/or may include a test process in which a semiconductor device or a package is tested.

Figure 2:
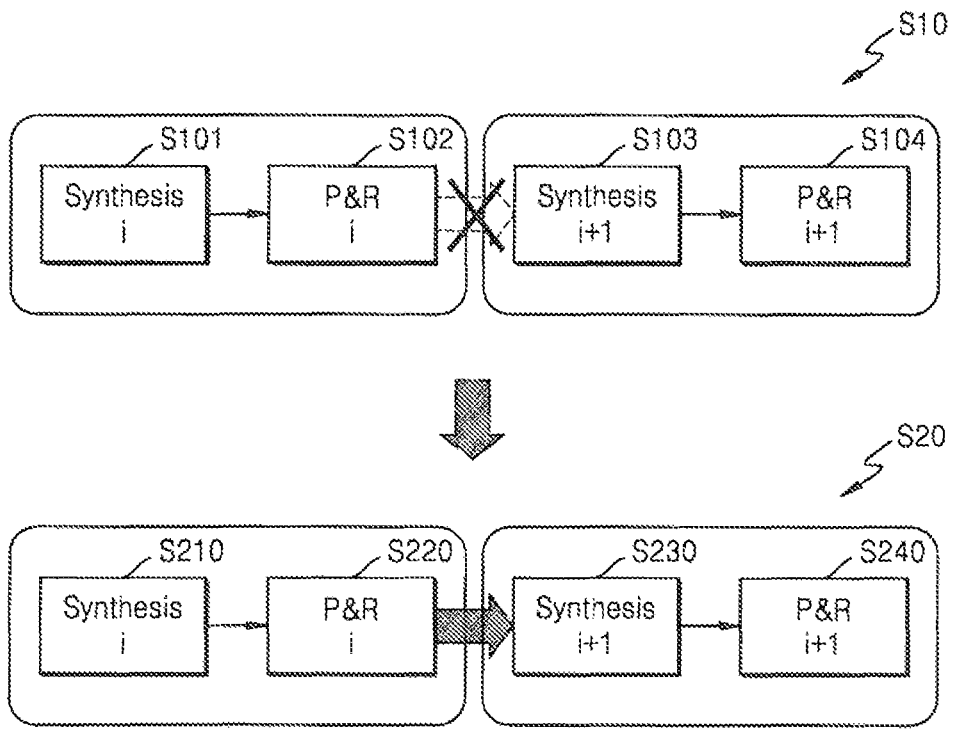
FIG. 2 is a block diagram conceptually illustrating operations of methods of designing integrated circuits according to some embodiments of the inventive concepts.

FIG. 2 is a block diagram conceptually illustrating operations of methods of designing integrated circuits according to some embodiments of the inventive concepts. For example, FIG. 2 illustrates a method of designing an integrated circuit S10 according to comparative embodiments and a method of designing an integrated circuit S20 according to some embodiments of the inventive concepts.

Referring to FIG. 2, according to the method of designing an integrated circuit S10 according to comparative embodiments, an ith synthesis operation S101 may be performed, and then an ith P&R operation S102 may be performed. Next, an i+1th synthesis operation S103 may be performed, and then an i+1th P&R operation S104 may be performed (here, i is an arbitrary natural number). As described above, the synthesis operation and the P&R operation may be configured to be one set or one module, and it may be referred to as Silicon Virtual Prototyping (SVP). The SVP may be repeatedly performed to reflect a change of an RTL code and a floorplan. A result of the ith P&R operation S102 may be not used in the i+1th synthesis operation S103, and no data may be transmitted from the ith P&R operation S102 to the i+1th synthesis operation S103.

According to the method of designing an integrated circuit S20 according to some embodiments of the inventive concepts, an ith synthesis operation S210 may be performed and then, an ith P&R operation S220 may be performed. Next, an i+1th synthesis operation S230 may be performed, and then an i+1th P&R operation S240 may be performed (here again, i is an arbitrary natural number). A result of the ith P&R operation S220 may be used in the i+1th synthesis operation S230, and data such as characteristic values, representative characteristic values, or a physical-aware annotation file may be transmitted from the ith P&R operation S220 to the i+1th synthesis operation S230.

Figure 3:
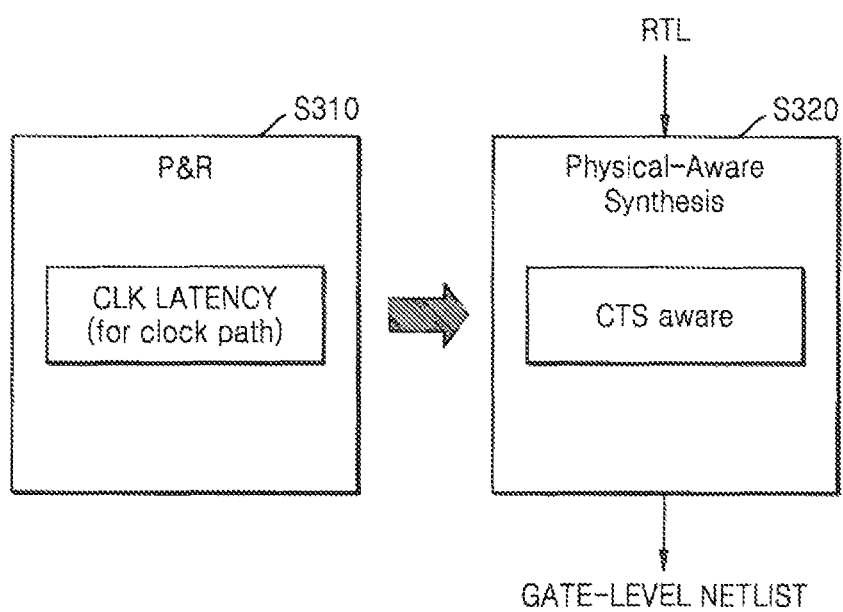
FIG. 3 is a block diagram conceptually illustrating operations of methods of designing integrated circuits according to some embodiments of the inventive concepts.

FIG. 3 is a block diagram conceptually illustrating operations of methods of designing integrated circuits according to some embodiments of the inventive concepts.

Referring to FIG. 3, in a P&R operation S310, clock latency information on a clock path may be extracted, and the extracted clock latency information may be pro vided to a synthesis tool as an input file so as to be used in a subsequent synthesis operation. For example, P&R operation S310 may be the ith P&R operation S220 of FIG. 2. Specifically, in P&R operation S310, clock latency information on clock pins of all flip-flops of a circuit may be extracted. Also, in P&R operation S310, a clock latency table may be generated based, on the extracted clock latency information.

In a physical-aware synthesis operation S320, a gate-level netlist may be generated from an RTL code using the clock latency information. For example, the physical-aware synthesis operation S320 may be the i+1th synthesis operation S230 of FIG. 2. The physical-aware synthesis operation S320 may be a synthesis operation recognizing BEOL CTS. The synthesis operation may be performed using the clock latency information extracted from previous P&R operation S310, and thus, a netlist reflecting a CTS result. In some embodiments, a method of using clock latency information may be a clock latency annotation. Embodiments including the clock latency annotation will be described with reference to FIGS. 4 to 5C.

In a synthesis operation, CTS may not be actually performed and synthesis and data path optimization may be performed using an ideal clock signal. When a difference between clock latencies occurring in BEOL is not considered, even, if a timing violation does not occur in a path during a synthesis operation, a timing violation may occur in the path during a P&R operation. In some embodiments of the inventive concepts, the synthesis operation may be performed using the clock latency information extracted in P&R operation S310, and thus data path optimization in the synthesis operation may be performed more precisely to generate a more optimized netlist. Then, the P&R operation may be performed according to the more optimized netlist, and thus, a time required for timing closure may be reduced and a P&R result may be improved.

In some embodiments, clock paths included in an integrated circuit may be grouped into a plurality of groups, and in a synthesis operation, an identical clock latency may be applied to clock paths included in the same group. For example, logic modules included in an integrated circuit may be grouped into a plurality of groups according to module hierarchy. Identical clock latencies may be applied to logic modules included in the same group, and different clock latencies may be applied to logic modules included in different groups. Descriptions thereof will be described with reference to FIG. 8.

Figure 4:
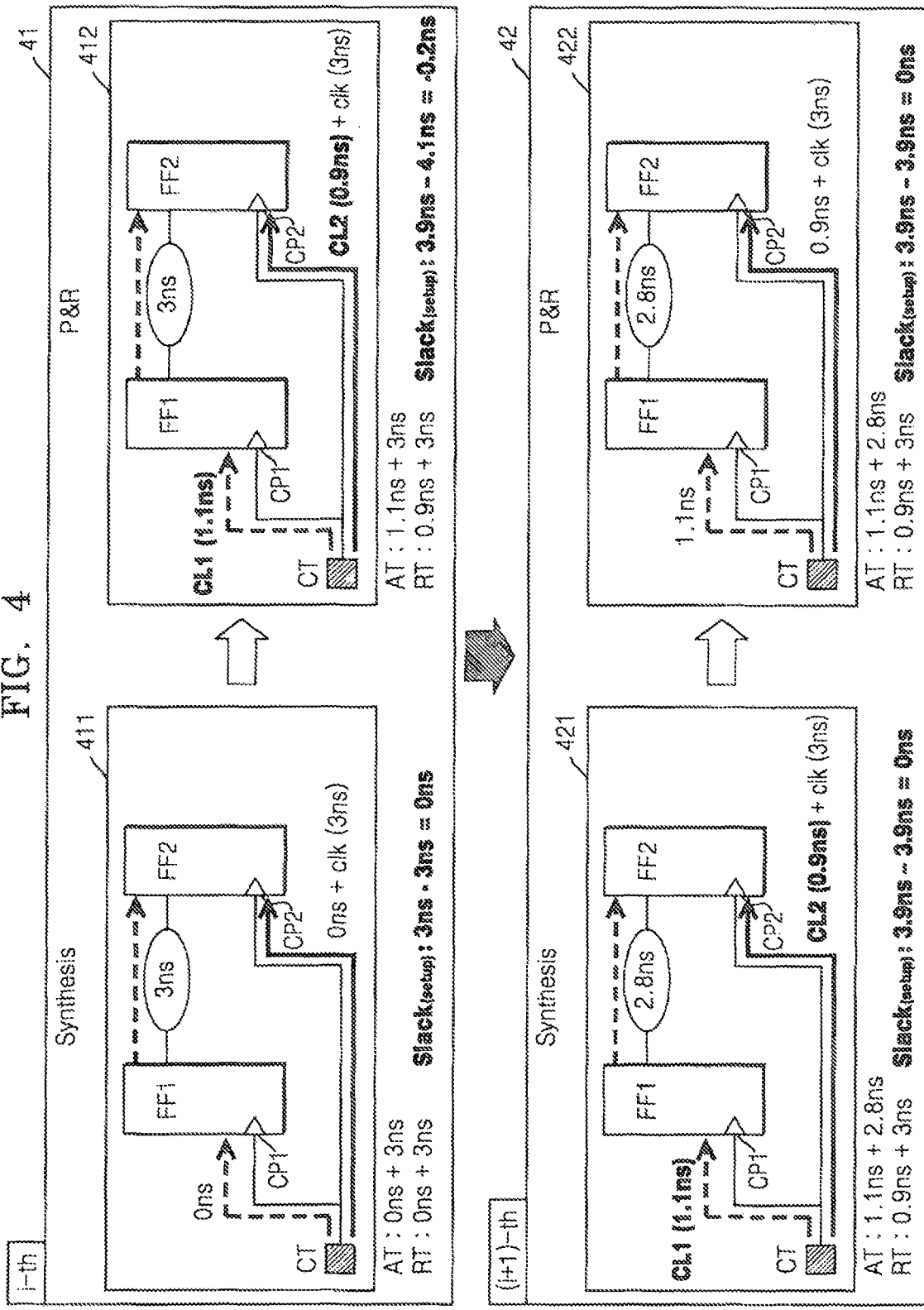
FIG. 4 is a block diagram conceptually illustrating a clock latency annotation according to some embodiments of the inventive concepts.

FIG. 4 is a block diagram conceptually illustrating a clock latency annotation according to some embodiments of the inventive concepts.

Referring to FIG. 4, a plurality of SVPs may be performed, for example an ith SVP 41 may be performed and then an i+1th SVP 42 may be performed. The ith SVP 41 may include an ith synthesis operation and an ith P&R operation. A netlist defining an integrated circuit 411 may be output in the ith synthesis operation, and layout data and a clock latency annotation file of an integrated circuit 412 may be output in the ith P&R operation. The i+1th SVP 42 may include an i+1th synthesis operation and an i+1th P&R operation. A netlist defining an integrated circuit 421 may be output In the i+1th synthesis operation, and layout data and a clock latency annotation file of an integrated circuit 422 may be output. In the i+1th P&R operation.

The integrated circuit 411 may include first and second flip-flops FF1 and FF2. The first flip-flop FF1 may include a first clock pin CP1, and a path from a clock terminal CT to the first clock pin CP1 may be defined as a first clock path. The second flip-flop FF2 may include a second clock pin CP2, and a path from the clock terminal CT to the second clock pin CP2 may be defined as a second clock path. A path from an output terminal of the first flip-flop FF1 to an input terminal of the second flip-flop FF2 may be defined as a data path.

In the ith synthesis operation, timing may be predicted using an ideal clock signal. For example, timing may be predicted based on a delay of 0 ns (i.e., no delay) on the first and second clock paths. Accordingly, as a result of the ith synthesis operation, a difference between a required time (RT) (e.g., 3 ns) according to timing constraints and an arrival time (AT) (e.g., 3 ns), that is a slack, may be 0 ns, and it may be predicted that timing violation may not occur.

CTS may be performed based on cell location information and net connection information after a cell placement is completed. Thus, since an actual cell placement may not be performed before the ith synthesis operation, synthesis and data path optimization may be performed under an assumption that a clock network is ideal. As described above, when synthesis is performed based on the ideal clock net, a clock skew between the first and second flip-flops FF1 and FF2 may not occur.

However, in the ith P&R operation, a clock propagation delay may occur, and a clock skew between the first and second flip-flops FF1 and FF2 may occur. The clock skew between the first and second flip-flops FF1 and FF2 may occur because first and second clock latencies CL1 and CL2 may not be adjusted to simultaneously and ideally toggle the first and second flip-flops FF1 and FF2, and an On-Chip Variation (OCV) margin for correcting a process variation may also be applied to the ith P&R operation.

For example, the first clock latency CL1 (e.g., 1.1 ns) may occur in the first clock path, and the second clock latency CL2 (e.g., 0.9 ns) may occur in the second clock path. In this regard, as a result of the ith P&R operation, a slack (i.e., RT-AT) may have a negative value (e.g., −0.2 ns), and timing violation may occur. The first clock latency CL1 on the first clock pin CP1 and the second clock latency CL2 on the second clock pin CP2 may be extracted from a result of the ith P&R operation.

In the i+1th synthesis operation, timing may be predicted using the first and second clock latencies CL1 and CL2 extracted from a result of the ith P&R operation instead of using an ideal clock signal. In other words, the first clock latency CL1 may be applied to the first clock path, and the second clock latency CL2 may be applied to the second clock path. Also, a difference between, the first clock latency CL1 and the second clock latency CL2 (i.e., CL1−CL2=0.2 ns) may be applied to a data path and data path optimization may be performed. Thus, a slack may be 0 ns (i.e., no slack) as a result of the i+1th synthesis operation, and a more optimized netlist may be output as a result of the i+1th synthesis. In the i+1th P&R operation, even when a clock propagation delay occurs, the first and second clock latencies CL1 and CL2 may be already applied to the i+1th synthesis and thus, a slack may be 0 ns as a result of the i+1th P&R operation.

Figure 5A:
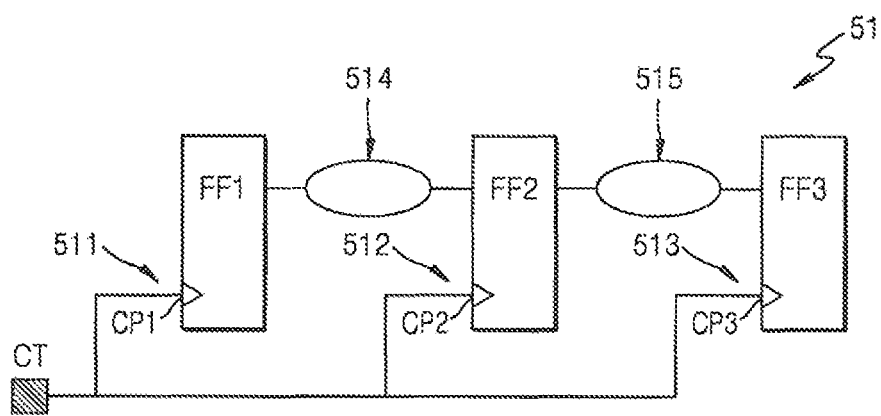
FIGS. 5A to 5C are block diagrams conceptually illustrating clock latency annotations according to some embodiments of the inventive concepts.
Figure 5B:
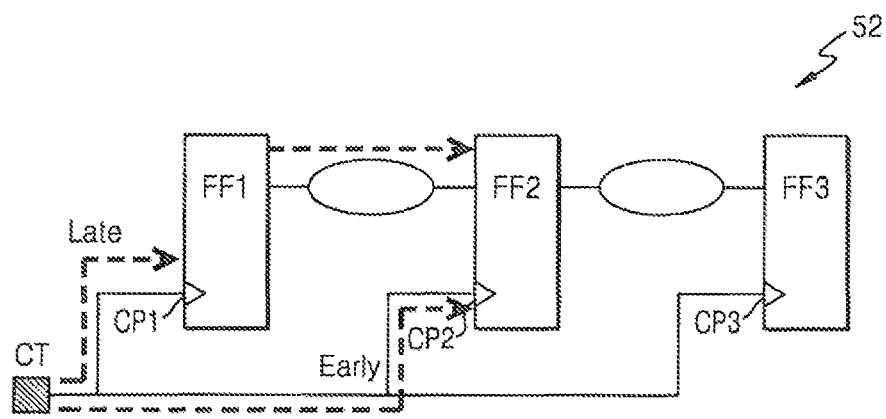
Figures 5C, 6:
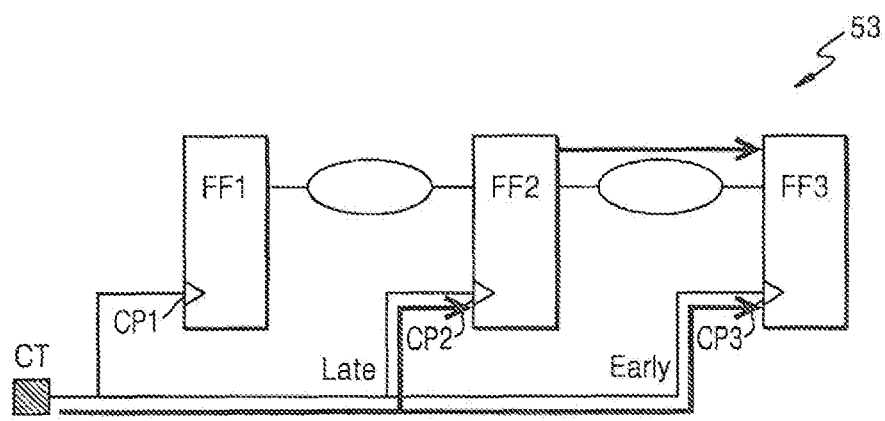
FIG. 6 is a table of minimum and maximum clock latencies according to some embodiments of the inventive concepts.

FIGS. 5A to 5C are block diagrams conceptually illustrating clock latency annotations according to some embodiments of the inventive concepts.

Referring to FIG. 5A, an integrated circuit 51 may include first to third flip-flops FF1 to FF3. The first flip-flop FF1 may include a first clock pin CP1, and a path from a clock terminal CT to the first clock pin CP1 may be defined as a first clock path 511. The second flip-flop FF2 may include a second clock pin CP2, and a path from the clock terminal CT to the second clock pin CP2 may be defined as a second clock path 512. The third flip-flop FF3 may include a third clock pin CP3, and a path from the clock terminal CT to the third clock pin CP3 may be defined as a third clock path 513. A path from an output terminal of the first flip-flop FF1 to an input terminal of the second flip-flop FF2 may be defined as a first data path 514, and a path from an output terminal of the second flip-flop FF2 to an input terminal of the third flip-flop FF3 may be defined as a second data path 515.

Referring to FIG. 5B, an integrated circuit 52 may respectively Include first timing paths, which are illustrated by clotted lines, between the clock terminal CT and the first flip-flop FF1 and between the clock terminal CT and the second flip-flop FF2. Here, the first flip-flop FF1 may operate as a launch flip-flop, and the second flip-flop FF2 may operate as a capture flip-flop. In a worst case for the first timing path, a first clock latency with respect to the first clock pin CP1 may have a maximum value (i.e., a late clock signal is applied to the first clock pin CP1), and a second clock latency with respect to the second clock pin CP2 may have a minimum value (i.e., an early clock signal is applied to the second clock pin CP2). Thus, for physical-aware synthesis of the first timing path, the maximum value of the first clock latency and the minimum value of the second clock latency may be required.

Referring to FIG. 5C, an integrated circuit 53 may include second timing paths, which are illustrated by bold lines, between the clock terminal CT and the second flip-flop FF2 and between the clock terminal CT and the third flip-flop FF3. Here, the second flip-flop FF2 may operate as a launch flip-flop, and the third flip-flop FF3 may operate as a capture flip-flop. In a worst case of the second timing path, a second clock latency on the second clock, pin CP2 may have a maximum value (i.e., a late clock is applied to the second clock pin CP2), and a third clock latency on the third clock pin. CP3 may have a minimum value (i.e., an early clock is applied to the third clock pin CP3). Thus, for a physical-aware synthesis of the second timing path, the maximum value of the second clock latency and the minimum value of the third clock latency may be required.

As described above, according to a configuration of a timing path, the second flip-flop FF2 may operate as a capture flip-flop as described in FIG. 5B or may operate as a launch flip-flop as described in FIG. 5C. The maximum and minimum values of the second clock, latency on the second clock pin CP2 may respectively be extracted from a result of a P&R operation. However, the inventive concepts are not limited to the second flip-flop FF2 and may also be applied to the first and third flip-flops FF1 and FF3.

FIG. 6 is a table of minimum and maximum clock latencies according to some embodiments of the inventive concepts.

Referring to FIGS. 5A, 5B, 5C, and 6, a first clock latency table 61 may be extracted from a result of a P&R operation, and may be used in a next synthesis operation by using a clock latency annotation. A first maximum clock latency (CL1_max) and a first minimum clock latency (CL1_min) on the first clock pin CP1 may be extracted. Also, a second maximum clock latency (CL2_max) and a second minimum clock latency (CL2_min) on the second clock pin CP2 may be extracted. In addition, a third maximum clock latency (CL3_max) and a third minimum clock latency (CL3_min) on the third clock pin CP3 may be extracted. For example, in the next synthesis operation, if the second flip-flop FF2 operates as a capture flip-flop (i.e., in a case of the first timing path), the second minimum clock latency (CL2_min) may be applied, and if the second flip-flop FF2 operates as a launch flip-flop (i.e., in a case of the second timing path), the second maximum clock latency (CL2_max) may be applied.

FIG. 7A is a flowchart illustrating operations of the designing method of FIG. 3, according to some embodiments of the inventive concepts.

Referring to FIG. 7A, in an ith P&R operation 71, a P&R may be implemented 711, a clock latency may be extracted from a result of the P&R 712, and then a clock latency table may be output therefrom 713. The implementation of the P&R 711 may include operations from a placement operation to a post route optimization operation. The extraction of the clock latency 12. 712 may be performed in the post route optimization operation. In some embodiments, for example, the clock latency table 713 may be generated to include a clock latency for each clock pin as described with reference to FIG. 6. In some embodiments, for example, the clock latency table 713 may be generated to include a representative clock latency for each group as described with reference to FIG. 8. For example, the representative clock latency may correspond to an average of clock latencies included in each group.

In an i+1th synthesis operation 72, a clock latency annotation file 721 may be received, an RTL code may be compiled 722 using the clock latency annotation file 721, and then a netlist may be output. Accordingly, in the i+1th synthesis operation 72 in which a CTS is not actually performed, a CTS-aware netlist may be obtained. The clock latency annotation file 721 may correspond to the clock latency table 713 that was output In the ith P&R operation 71.

In an i+1th P&R operation 73, floor planning 731 may be performed, a clock latency annotation file 732 may be received, and then standard cells may be placed 733 according to the netlist using the clock latency annotation file 732. Thus, in the placement operation 733 before CTS is performed, a CTS-aware placement result may be obtained. The clock latency annotation file 732 may correspond to the clock latency table 713 that was output in the ith P&R operation 71. Then, the clock latency annotation file may be removed 734, and CTS 735, post CTS optimization 736, routing 737, and post route optimization 738 may be sequentially performed.

Alternatively, according to some embodiments of the inventive concepts, a clock latency may be extracted to generate a clock latency annotation file in the ith P&R operation, the clock latency annotation may be not used in the i+1th synthesis operation, and then a placement or a placement optimization may be performed using the clock latency annotation file in the i+1th P&R operation.

Figure 7B:
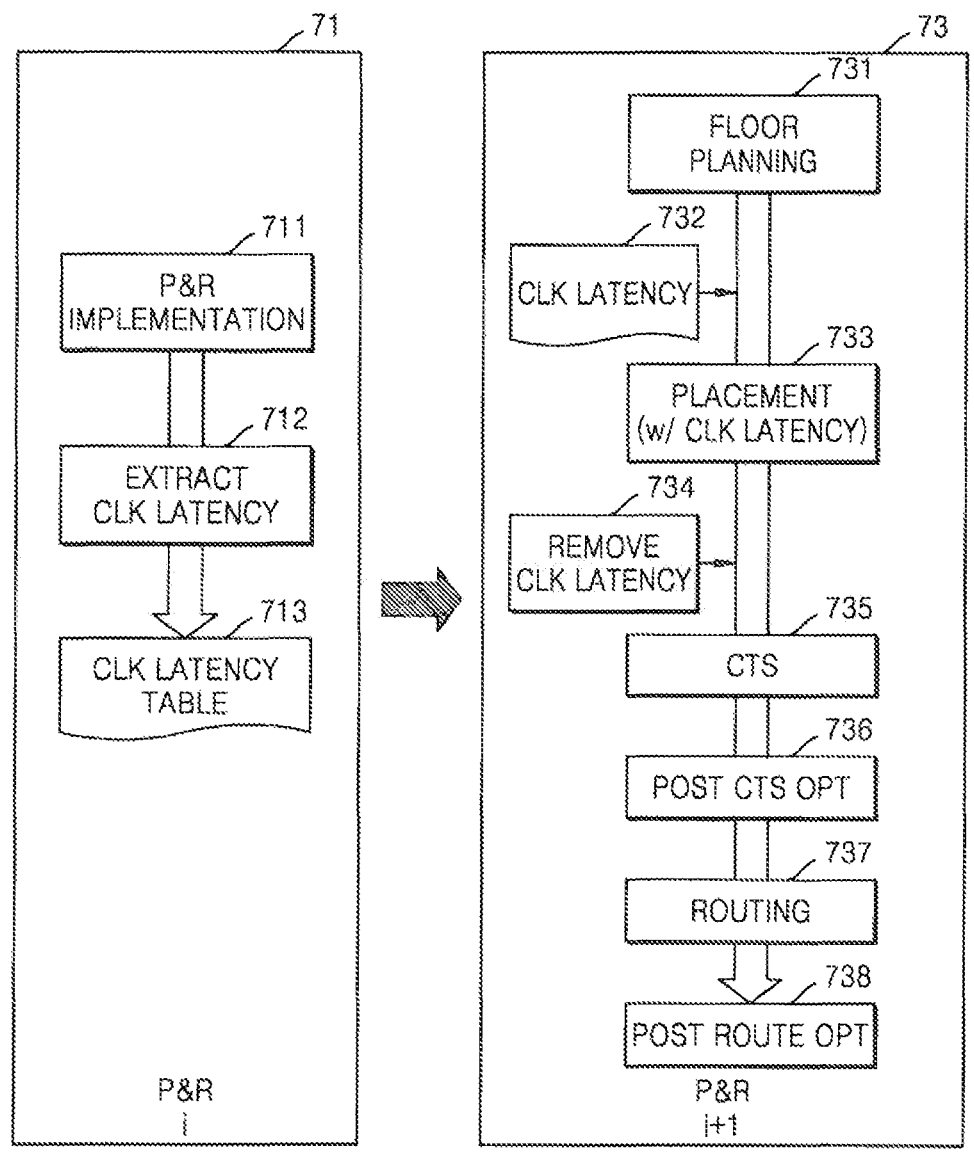
FIG. 7B is a flowchart illustrating operations of the designing method of FIG. 3, according to some embodiments of the inventive concepts.

FIG. 7B is a flowchart illustrating operations of the designing method of FIG. 3, according to some embodiments of the inventive concepts.

Some of the operations of FIG. 7B may be similar or the same as operations described with respect to FIG. 7A, and descriptions of FIG. 7A may also be applied to the embodiments of FIG. 7B. Referring to FIG. 7B, the ith P&R operation 71 may be performed and then, the i+1th P&R operation 73 may be performed. Between the ith P&R operation 71 and the i+1th P&R operation 73, the i+1th synthesis operation may be not performed. Thus, a first netlist input in the ith P&R operation 71 and a second netlist input in the i+1 th P&R operation 73 may be the same, and a clock latency extracted from the ith P&R operation 71 may be not applied to the second netlist. However, in the i+1th P&R operation 73, a floor planning 731 may be performed, a clock latency annotation file 732 may be received, and standard cells may be placed 733 according to a netlist using the clock latency annotation file 732. Thus, in the placement operation 733 before CTS is performed, a CTS-aware placement result may be obtained. The clock latency annotation file 732 may correspond to the clock latency table 713 that was output in the ith P&R operation 71.

FIG. 8 is a table of minimum and maximum clock latencies according to some embodiments of the inventive concepts.

Referring to FIG. 8, a second clock latency table 81 may be generated from a result of a P&R operation, and may be used in a subsequent synthesis operation by using a clock latency annotation. For example, the second clock latency table 81 may be generated from the first clock latency table 61 of FIG. 6. An instance name in an i+1th synthesis operation (e.g., S230 of FIG. 2) may differ from instance names in an ith synthesis operation (e.g., S210 of FIG. 2) and an ith P&R operation (e.g., S220 of FIG. 2). In this regard, when a clock latency table is generated according to instance names, clock latency information extracted in an ith P&R operation may not be applied to a clock path within an instance whose name is changed in an i+1th synthesis operation.

A plurality of representative clock latencies each corresponding to a plurality of groups may be calculated from clock latencies extracted from P&R operation and thus, the second clock latency table 81 may be generated. In some embodiments, a representative clock latency may correspond to an average of clock latencies of clock paths included in a group. For example, a representative clock latency corresponding to a first logic module group LMG1 may correspond to a first maximum clock latency CL_M1_max and a second minimum clock latency CL_M1_min.

According to some embodiments, logic modules included in an integrated circuit may be grouped into a plurality of logic module groups according to a module hierarchy. In other words, the logic modules may have different module depths from each other. For example, logic modules having a module depth of 1 level may be grouped, as the first logic module group LMG1, logic modules having a module depth of 2 level may be grouped as a second logic module group LMG2, and logic modules having a module depth of 3 level may be grouped as a third logic module group LMG3. A clock latency applied to a synthesis operation may differ in each of the logic module groups, and descriptions thereof will be provided in detail below.

A reference clock latency REF may include the maximum reference clock latency CL_max and the minimum reference clock latency CL_min. The maximum reference clock latency CL_max may be determined as an average of maximum clock latencies with respect to all clock pins included in an integrated circuit, and the minimum reference clock latency CL_min may be determined as an average of minimum clock latencies with respect to all the clock pins included in the integrated circuit. For example, the maximum reference clock latency CL_max may be an average of the first to third maximum clock latencies CL1_max to CL3_max of FIG. 6, and the minimum reference clock latency CL_min may be an average of the first to third minimum, clock latencies CL1_min to CL3_min of FIG. 6.

With respect to the first logic module group LMG1, the first maximum clock latency CL_M1_max and the first minimum clock latency CL_M1_min may be determined. The first maximum clock latency CL_M1_max may be determined as an average of maximum clock latencies on logic modules included in the first logic module group LMG1, and the first minimum clock latency CL_M1_min may be determined as an average of minimum clock latencies on logic modules included in the first logic module group LMG1. In this manner, a second maximum clock latency CL_M2_max and a second minimum clock latency CL_M2_min may be determined with respect to the second logic module group LMG2, and a third maximum clock latency CL_M3_max and a third minimum clock latency CL_M3_min may be determined with respect to the third logic module group LMG3.

In some embodiments, in a synthesis operation, a reference clock latency REF may first be applied to clock pins included in all logic modules. Then, a representative clock latency corresponding to each group may further be applied to clock pins included in logic modules in each group. In this regard, since the reference clock latency REF is applied to logic modules that are not included in the first to third logic module groups LMG1 to LMG3, physical-aware synthesis may be performed without exception even when an instance name is changed.

For example, with respect to logic modules included in the first logic module group LMG1, a difference between the maximum reference clock latency CL_max and the first maximum clock latency CL_M1_max, or a difference between the minimum reference clock latency CL_min and the first minimum clock latency CL_M1_min may be applied thereto. Likewise, with respect to logic modules included in the second logic module group LMG2, a difference between the maximum reference clock latency CL_max and the second maximum clock latency CL_M2_max, or a difference between the minimum reference clock latency CL_min and the second minimum clock latency CL_M2_min may be applied thereto. Also, with respect to logic modules included in the third logic module group LMG3, a difference between the maximum reference clock latency CL_max and the third maximum clock latency CL_M3_max, or a difference between the minimum reference clock latency CL_min and the third minimum clock latency CL_M3_min may be applied thereto.

In some embodiments, with respect to logic modules included in the first logic module group LMG1, the first maximum clock latency CL_M1_max or the first minimum clock latency CL_M1_min may be applied thereto. Alternatively, with respect to logic modules included in the second logic module group LMG2, the second maximum clock latency CL_M2_max or the second minimum clock latency CL_M2_min may be applied thereto. Alternatively, with respect to logic modules included in the third logic module group LMG3, the third maximum clock latency CL_M3_max or the third minimum clock latency CL_M3_min may be applied thereto. If all logic modules have module depths in the range of 1 to 3, all the logic modules may be grouped as one of the first to third login module groups LMG1 to LMG3, and thus the reference clock latency REF may not be applied, thereto.

Figure 9:
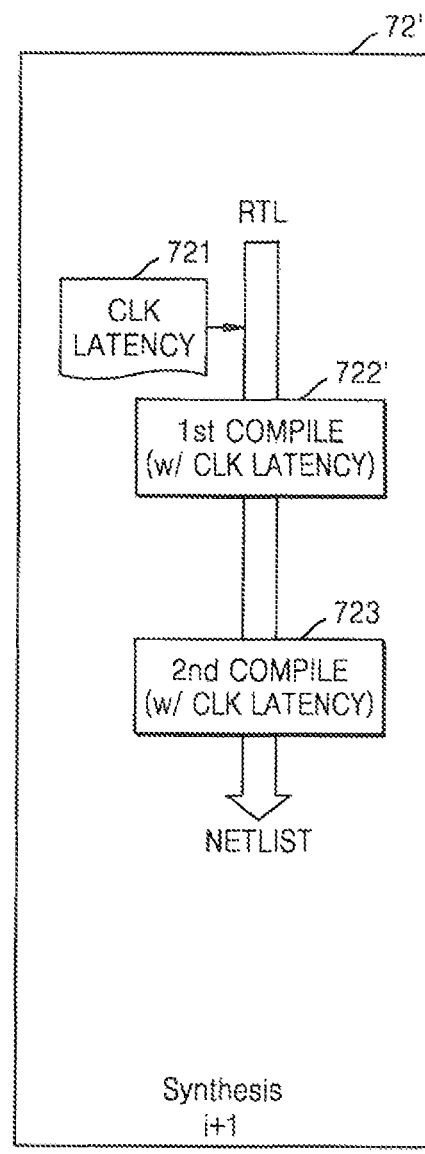
FIG. 9 is a flowchart Illustrating operations of the synthesis operation of FIG. 7A according to some embodiments of the inventive concepts.

FIG. 9 is a flowchart illustrating operations of the synthesis operation of FIG. 7A according to some embodiments of the inventive concepts.

Referring to FIG. 9, an i+1th synthesis operation 72' may be similar to or the same as the i+1th synthesis operation 72 of FIG. 7A except for the differences described below. For example, in the i+1th synthesis operation 72', a clock latency annotation file 721 may be received, an RTL code may be first compiled 722' using the clock latency annotation file 721, and a result of the first compiling may be second compiled 723. Here, the second compiling 723 may be performed to optimize a timing and may be referred to as an incremental compiling. In some embodiments, the second compiling 723 may compile using the clock latency annotation file 721. However, the inventive concepts are not limited thereto. In some embodiments, the second compiling 723 may compile without using the clock latency annotation file 721.

Figure 10:
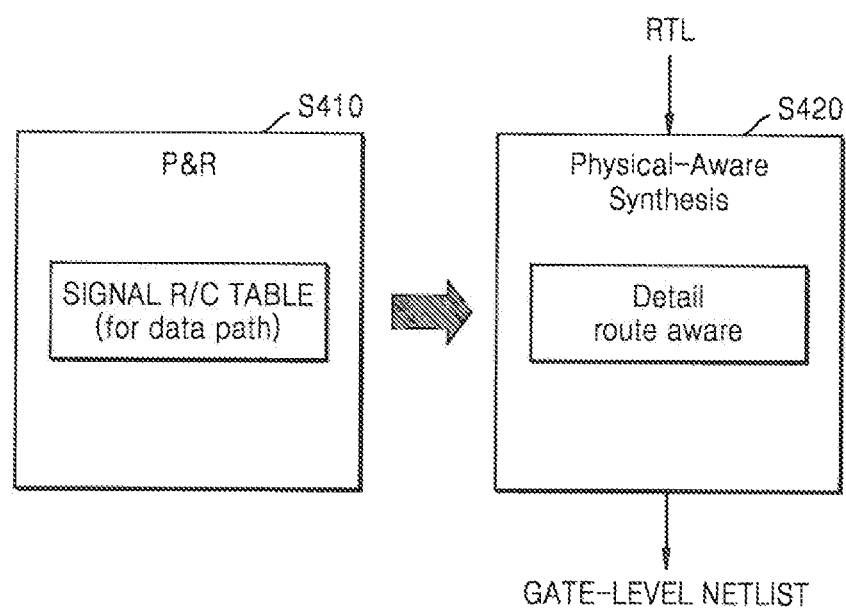
FIG. 10 is a block diagram conceptually illustrating operations of methods of designing integrated circuits according to some embodiments of the inventive concepts.

FIG. 10 is a block diagram conceptually illustrating operations of methods of designing integrated circuits according to some embodiments of the inventive concepts.

Referring to FIG. 10, in a P&R operation S410, parasitic component information on a data path may be extracted, and the extracted parasitic component information may be provided as an input file to a synthesis tool so as to utilize it in a next synthesis operation. For example, the P&R operation S410 may be the S220 of FIG. 2. Specifically, in P&R operation S410, parasitic component information on all signal nets may be extracted. For example, the parasitic information may include parasitic resistance information or parasitic capacitance information. In addition, in P&R operation S410, a parasitic scaling factor may be generated using the extracted parasitic component information.

In a physical-aware synthesis operation S420, a gate-level netlist may be generated from an RTL code using parasitic component information. For example, the physical-aware synthesis operation S420 may be S230 of FIG. 2. The physical-aware synthesis operation according to this embodiment may be a synthesis operation that recognizes detail routing of BEOL. A synthesis operation may be performed using the parasitic component, information extracted in P&R operation S410 and thus, a netlist reflecting a result of the detail routing may be generated. In some embodiments, a parasitic component annotation may be used as parasitic component information.

In a synthesis operation, detail routing may be not actually performed. Global routing may be instead performed, and parasitic components of a signal net may be predicted according to a result of the global routing. In this regard, physical nets do not actually exit and thus, it may be difficult to measure an effect of coupling capacitance between adjacent nets. Also, in the synthesis operation, a layer assignment with respect to a signal net may be performed according, to congestion or timing constraints. Here, it may be difficult to consider via resistance according to layer levels. When such coupling capacitance or via resistance of a physical net is not considered, a predicted parasitic component and a predicted net delay may not be correct.

A parasitic scaling factor may be generated from the parasitic component information extracted in P&R operation S410, and In physical-aware synthesis operation S420, the parasitic scaling factor may apply to a parasitic component of a signal net predicted based on a result of global routing. Accordingly, in physical-aware synthesis operation S420, a parasitic component and a net delay may be more precisely predicted.

In some embodiments, signal nets included In an integrated circuit may be grouped into a plurality of groups, and in a synthesis operation, an identical parasitic scaling factor may be applied to signal nets included in a group of the groups. For example, signal nets included in an integrated circuit may be grouped into a plurality of groups according to a length of a net, an identical parasitic scaling factor may be applied to signal nets included in a group of the groups, and then a different parasitic scaling factor may be applied to signal nets included in another group. Descriptions thereof will be described with reference to FIGS. 13A and 13B.

Figure 11:
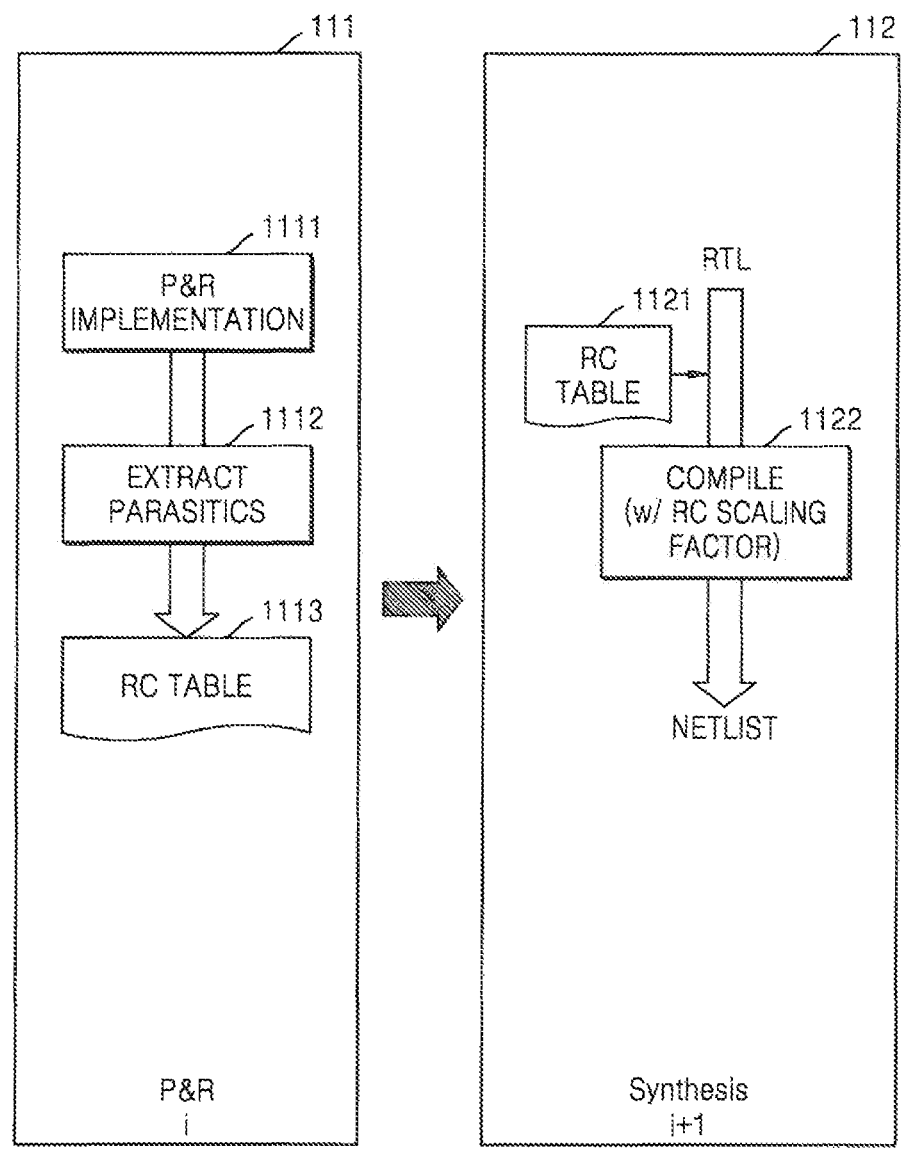
FIG. 11 is a flowchart illustrating operations of the designing method of FIG. 10, according to some embodiments of the inventive concepts.

FIG. 11 is a flowchart illustrating operations of the designing method of FIG. 10, according to some embodiments of the inventive concepts.

Referring to FIG. 11, in an ith P&R operation 111, P&R may be implemented 1111, parasitic components may be extracted from a result of the P&R 1112, and thus, a parasitic component table 1113 may be output. For example, the parasitic component table 1113 may include a parasitic resistance table and a parasitic capacitance table. The implementation of P&R 1111 may include operations from a placement operation to a post route optimization operation. The extraction of the parasitic components 1112 may be performed in the post route optimization operation. In some embodiments, the parasitic component table 1113 may be generated to include parasitic components for each signal net. In some embodiments, the parasitic component table 1113 may be generated to include a representative parasitic scaling factor for each group. For example, the representative parasitic scaling factor may correspond to an average of parasitic scaling factors included in each group.

In an i+1th synthesis operation 112, a parasitic component annotation file 1121 may be received, an RTL code may be complied 1122 using the parasitic component annotation file 1121, and then a netlist may be output. In this regard, in the i+1th synthesis operation 112 in which a detail routing may be not actually performed, a detail routing-aware netlist may be obtained. The parasitic component, annotation file 1121 may correspond to the parasitic component table 1113 output in the ith P&R operation 111.

Figure 12:
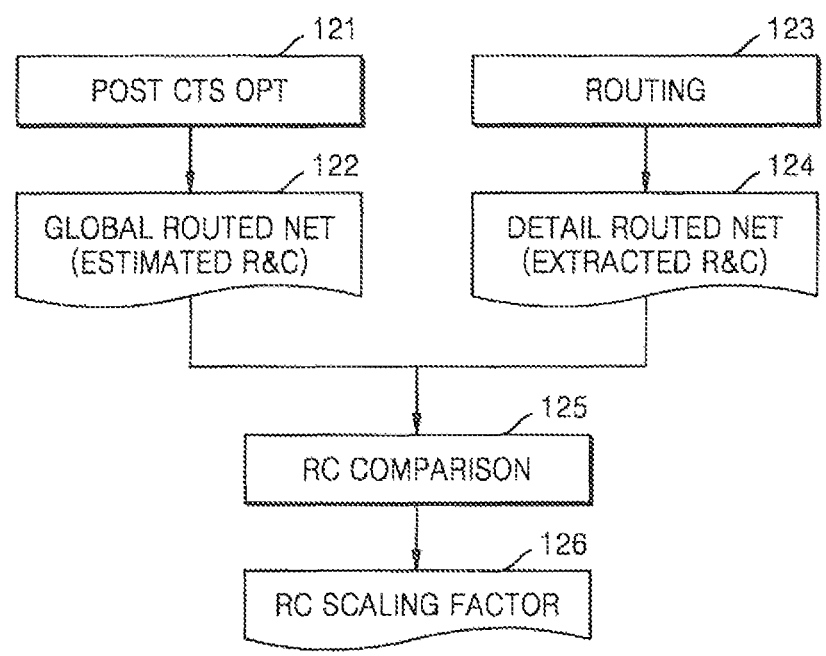
FIG. 12 is a flowchart illustrating operations of methods of generating a parasitic scaling factor table, according to some embodiments of the inventive concepts.

FIG. 12 is a flowchart illustrating operations of methods of generating a parasitic scaling factor table according to some embodiments of the inventive concepts.

Referring to FIGS. 11 and 12, a parasitic scaling factor table may correspond to the parasitic component table 1113 and may be generated in the ith P&R operation 111. However, the inventive concepts are not limited thereto. The parasitic scaling factor table may be generated after the ith P&R operation 111. The parasitic scaling factor table may include, for example, a parasitic resistance scaling factor table of FIG. 13A and a parasitic capacitance scaling factor table of FIG. 13B. In ith P&R operation 111, for example, floor planning, placement, CTS, post CTS optimization, routing, and post route optimization may be sequentially performed as described with reference to the i+1th P&R operation 73 of FIG. 7A.

As a result of the post CTS optimization operation 121, global-routed nets 122 may be output, and first parasitic resistances and first parasitic capacitances may be estimated from the global-routed nets 122. Also, as a result of a routing operation 123, detail-routed nets 124 may be output, and second parasitic resistances and second parasitic capacitances may be extracted from the detail-routed nets 124.

Then, a parasitic component comparison operation 125 may be performed. In detail, the estimated first parasitic resistances may be compared with the extracted second parasitic resistances, and the estimated first parasitic capacitances may be compared with the extracted second parasitic capacitances. As a result of the parasitic component comparison operation 125, parasitic scaling factors 126 may be output, and a parasitic scaling table may be generated from the output parasitic scaling factors 126.

In some embodiments, signal nets may be grouped into a plurality of groups according to various standards. For example, signal nets may grouped into a plurality of groups according to the number of fanout pins, a length of a net, a direct, connection status between a net and a macro eel L a direct connection status between a net and an input/output (I/O) cell, and the like. In some embodiments, a parasitic scaling table with respect to each of a plurality of groups may be generated from output parasitic scaling factors.

FIG. 13A is a table of parasitic resistance sealing factors according to some embodiments of the inventive concepts.

Referring to FIG. 13A, a parasitic resistance scaling factor table 131 may be generated according to the number of fanout (FO) pins and a length of a net. Here, the length of the net may correspond to an upper limit of a length of a signal net. Thus, parasitic resistance scaling factors applied to signal nets having a length that is equal to or less, than a first length L1 may differ according to the number of FO pins.

For example, if the number of FO pins is 1, and a net length is equal to or less than the first length L1 (e.g., 1 μm) for a signal net, scaling factor R11. (e.g., 1.34) may be applied to the signal net and thus, a physical-aware synthesis may be performed using scaling factor R11 in an i+1th synthesis operation. For example, if the number of FO pins is 3 and a length of a net is in the range between the first length L1 and a second length L2 (e.g., 2 μm) for a signal net, scaling factor R32 (e.g., 1.21) may be applied to the signal net and thus, a physical-aware synthesis may be performed using scaling factor R32 in the i+1th synthesis operation.

FIG. 13B is a table of parasitic capacitance scaling factors according to some embodiments of the inventive concepts.

Referring to FIG. 13B, a parasitic capacitance scaling factor table 132 may be generated according the number of FO pins and a length of a net. Here, the length of the net may correspond to an upper limit of a length of a signal net. Thus, parasitic capacitance scaling factors applied to signal nets having a length that is equal to or less than a first length L1 may differ depending on the number of FO pins.

For example, if the number of FO pins is 1 and a length of a net is equal to or less than the first length L1 for a signal net, scaling factor C11 (e.g., 1.34) may be applied to the signal net and thus, a physical-aware synthesis may be performed using scaling factor C11 in an i+1th synthesis operation. For example, if the number of FO pins is 2 and a length of a net is in the range between the first length L1 and a second length L2 for a signal net, scaling factor C22 (e.g., 1.41) may be applied to the signal net and thus, a physical-aware synthesis may be performed using scaling factor C22 in the i+1th synthesis operation. A netlist generated as a result of the physical-aware synthesis may be a netlist reflecting a result of detail routing and may be referred to as a detail routing-aware netlist.

Figure 14:
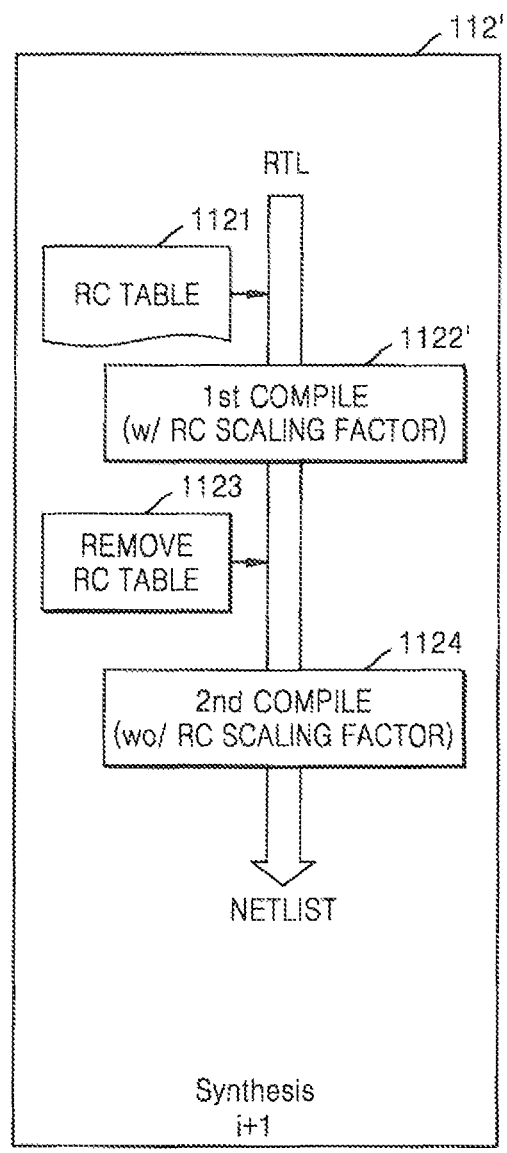
FIG. 14 is a flowchart illustrating operations of the synthesis operation of FIG. 11 according to some embodiments of the inventive concepts.

FIG. 14 is a flowchart illustrating operations of the synthesis operation of FIG. 11 according to some embodiments of the inventive concepts.

Referring to FIG. 14, an i+1th synthesis operation 112' may be similar to or the same as the i+1th synthesis operation 112 of FIG. 11 except for the differences described below. For example, in the i+1th synthesis operation 112', a parasitic component annotation file 1121 may be received, and an RTL code may be first compiled 1222' using the parasitic component annotation file 1121. Then, the parasitic component annotation file 1121 may be removed 1223, and a result of the first compiling may be second compiled 1124. Here, the second compiling may be performed to optimize a timing and may be referred to as incremental compiling. However, the inventive concepts are not limited thereto, and in some embodiments, the second compiling 1124 may include compiling using a parasitic component annotation file.

Figure 15:
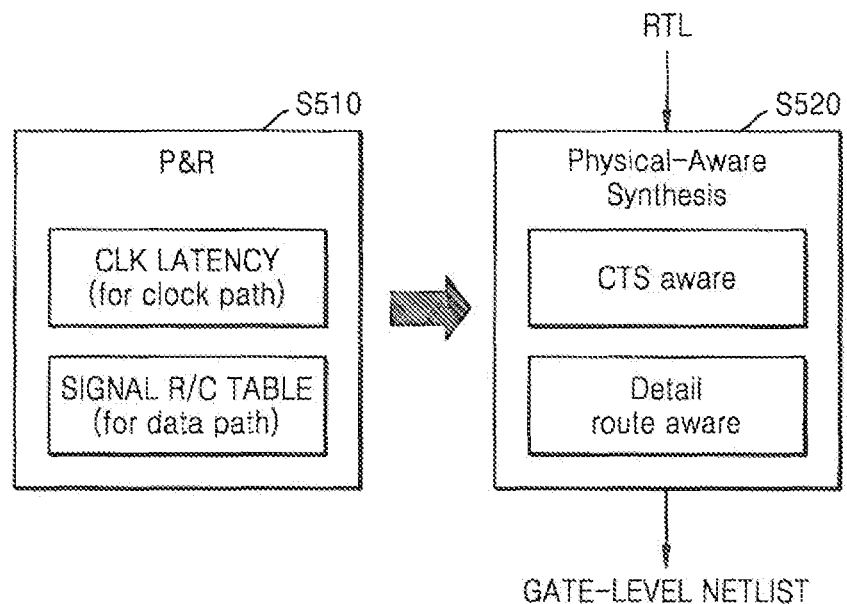
FIG. 15 is a block diagram conceptually illustrating operations of methods of designing integrated circuits according to some embodiments of the inventive concepts.

FIG. 15 is a block diagram, conceptually illustrating operations of methods of designing integrated circuits according to some embodiments of the inventive concepts.

Referring to FIG. 15, a method of designing an integrated circuit may correspond to one or more of the designing methods of FIGS. 3 and 10. In this regard, descriptions provided with reference to FIGS. 3 and 10 may also apply to the embodiments of FIG. 15 and repetitive descriptions thereof may be omitted. In a P&R operation S510, clock latency information on a clock path and parasitic component information on a data path may be extracted. The extracted clock latency information and the extracted parasitic component information may be provided to a synthesis tool as input files in order to be utilized in a subsequent synthesis operation.

In a physical-aware synthesis, operation S520, a gate-level netlist may be generated from an RTL code using the clock latency information and the parasitic component information. A CTS may be not performed In an actual synthesis operation. However, the synthesis operation may be performed using the clock latency information extracted in the P&R operation S510 and thus, a netlist reflecting CTS may be generated. Also, a global routing may be performed in an actual synthesis operation, but the synthesis operation may be performed using the parasitic component information extracted in the P&R operation S510 and thus, a netlist reflecting detail routing may be generated.

Figure 16:
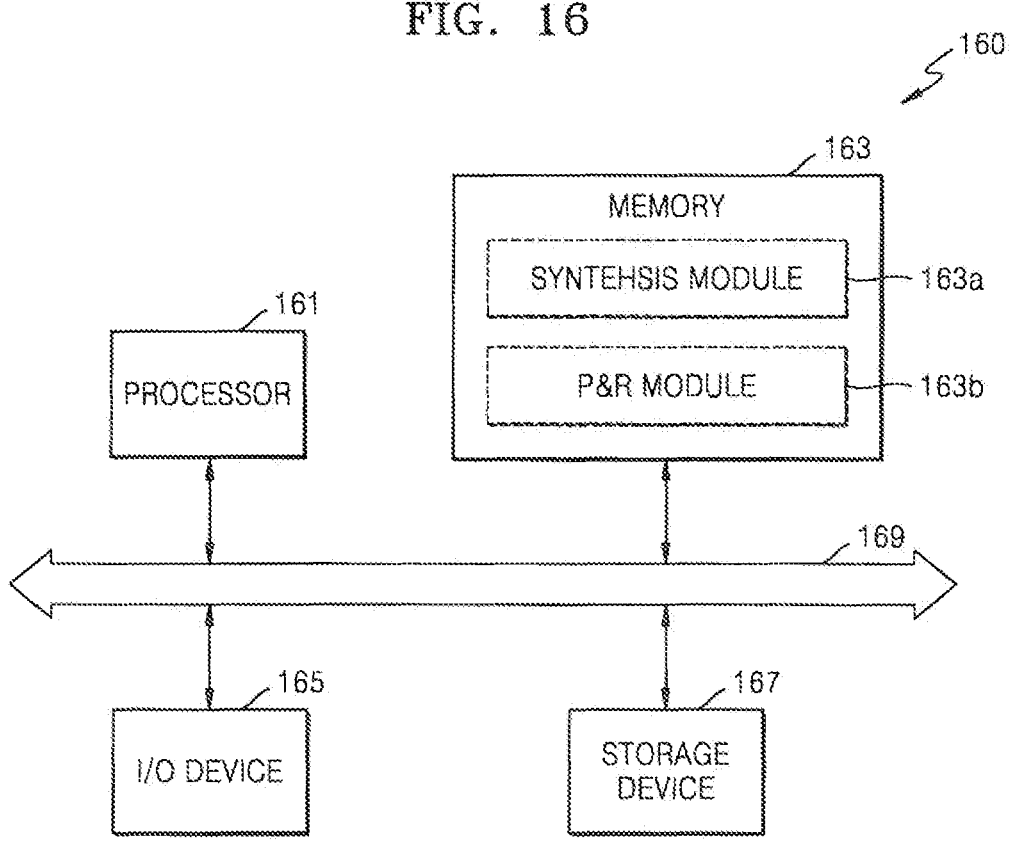
FIG. 16 is a block diagram illustrating a computing system for designing integrated circuits according to some embodiments of the inventive concepts.

FIG. 16 is a block diagram illustrating a computing system for designing integrated circuits according to some embodiments of the inventive concepts.

Referring to FIG. 16, a computing system for designing an integrated circuit (hereinafter, referred to as the 'integrated circuit design system') 160 may include a processor 161, a working memory 163, an I/O device 165, a storage device 167, and a bus 169. The integrated circuit design system 160 may perform, for example, an integrated circuit design operation including operations S110 and S130 of FIG. 1. The integrated circuit design system 160 may be embodied as an integrated device and thus, may be referred to as an integrated circuit designing device. The integrated circuit design system 160 may be provided as a dedicated device for designing an integrated circuit of a semiconductor device, but may also be a computer for driving various simulations tools or designing tools.

The processor 161 may be configured to execute instructions for implementing at least one of various operations for designing an integrated circuit. The processor 161 may communicate with the working memory 163, the I/O device 165, and the storage device 167 through the bus 169. The processor 161 may drive a synthesis module 163a and a P&R module 163b loaded in the working memory 163 and thus, may perform an integrated circuit design operation.

The working memory 163 may store the synthesis module 163a and the P&R module 163b. The synthesis module 163a and the P&R module 163b may be loaded from the storage device 167 to the working memory 163. The working memory 163 may be a volatile memory such as a static random access memory (SRAM) or a dynamic random access memory (DRAM), or a nonvolatile memory such as a phase change random access memory (PRAM), a magnetic random access memory (MRAM), a resistive random access memory (ReRAM), a ferroelectric random access memory (FRAM), or a NOR flash memory.

The synthesis module 163a may be, for example, a program including a plurality of instructions for implementing the physical-aware synthesis operation according to operation S110 of FIG. 1. The P&R module 163b may be, for example, a program including a plurality of instructions for performing the P&R operation according to operation S130 in FIG. 1.

The I/O device 165 may control a user input and output from user interface devices. For example, the I/O device 165 may Include an input device such as a keyboard, a mouse, and a touch pad, and input data defining an integrated circuit may be input thereto. For example, the I/O device 165 may include an output device such as a display and a speaker and may display a placement result, a wiring result, a timing analysis result, or the like.

The storage device 167 may store various data related to the synthesis module 163a and the P&R module 163b. The storage device 167 may include a memory card such as a multi-media card (MMC), eMMC, SD, or MicroSD, a solid state drive, and a hard disk drive.

Figure 17:
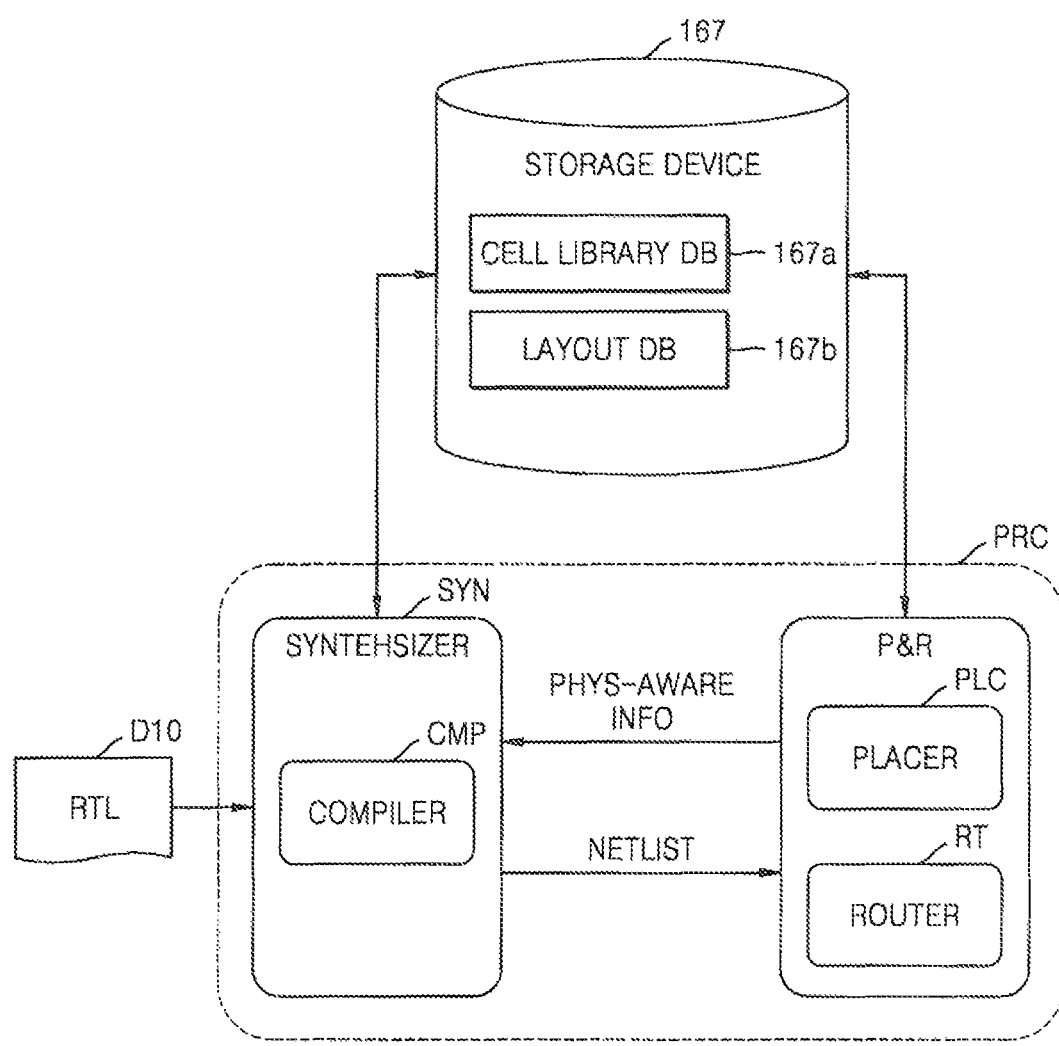
FIG. 17 is a block diagram illustrating a program stored in the working memory of FIG. 16 according to some embodiments of the inventive concepts.

FIG. 17 is a block diagram Illustrating a program stored in the working memory of FIG. 16 according to some embodiments of the inventive concepts.

Referring to FIGS. 16 and 17, a program stored in the working memory 163 may include a plurality of procedures PRC. Here, a procedure may mean a series of instructions for implementing a specific task. The procedure may be referred to as a function, a routine, a subroutine, a subprogram, or the like. For example, a procedure PRC may include a synthesizer SYN, a placer PLC, and a router RT. In additions the synthesizer SYN may include a compiler CMP. A description, provided herein, that the synthesizer SYN, the placer PLC, and/or the router RT performs an operation means that the processor 161 of FIG. 16 may execute program code of the synthesizer SYN, the placer PLC, and/or the router RT to perform such an operation.

The storage device 167 may include a cell library database (DB) 167a and a layout DB 167b. The cell library DB 167a may store information on a standard cell that is required to generate a layout of an integrated circuit, and may be referred to as a standard cell library DB, The layout DB 167b may store information on a layout generated by the procedure PRC, specifically, physical information on the layout. In addition, the storage device 167 may further include a technology file DB for storing rules and materials used in a manufacturing process of an integrated circuit, and the technology file DB may store, for example, a layer definition, a device definition, a design tool, or the like.

The synthesizer SYN may generate a netlist from an RTL code D10 based on characteristic values (i.e., physical-aware information) extracted from a result of previous P&R operations. In detail, the compiler CMP may receive a physical-aware annotation file according to the extracted characteristic values, and the RTL code D10 may be compiled using a physical-aware annotation file to generate a netlist.

The placer PLC may place standard cells based on the netlist, and in detail, the placer PLC may access to the cell library DB 167a to perform a placement operation. In some embodiments, the placer PLC may place standard cells using a physical-aware annotation file and thus, placement performance may be improved. The router RT may perform a routing with respect to the standard cells placed by the placer PLC thereby generating layout data.

Figure 18:
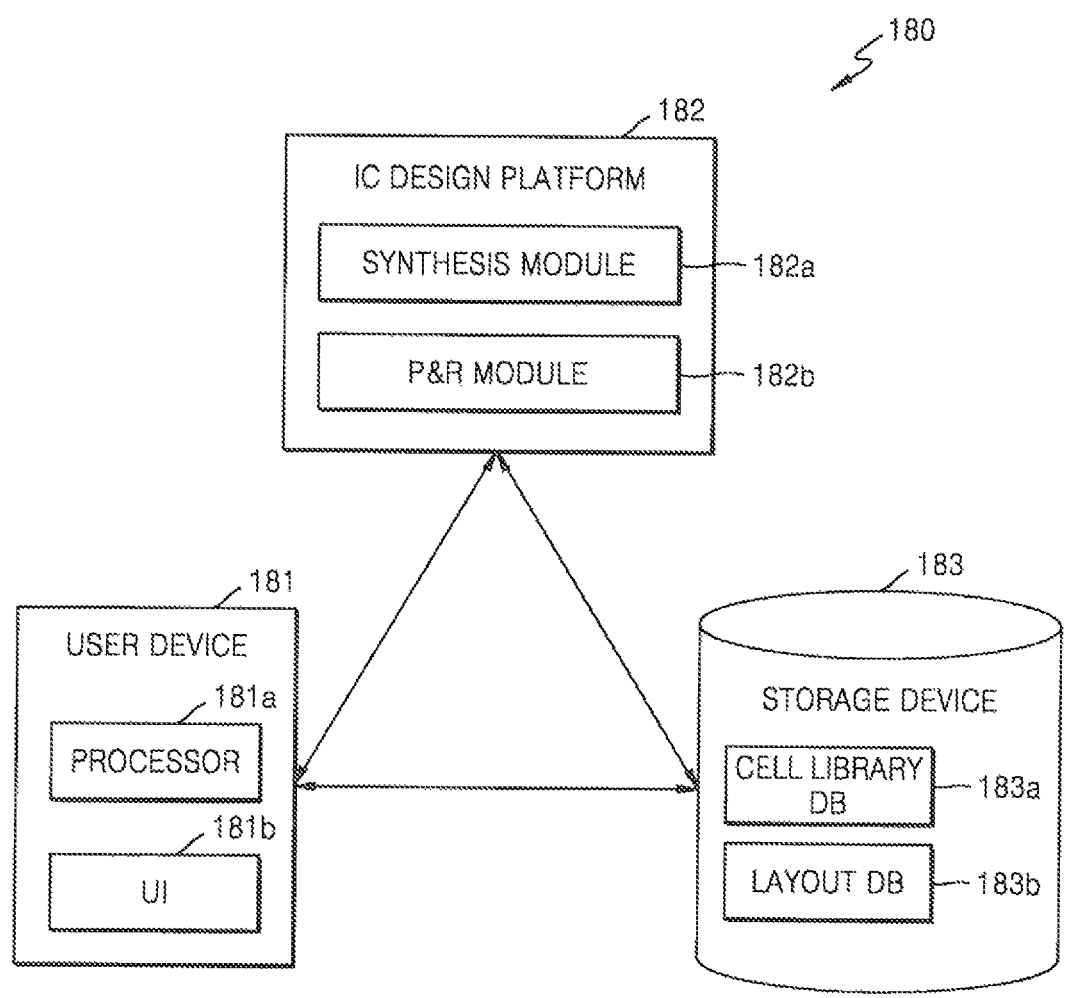
FIG. 18 is a block diagram illustrating a computing system for designing integrated, circuits according, to some embodiments of the inventive concepts.

FIG. 18 is a block diagram illustrating a computing system for designing integrated circuits according to some embodiments of the inventive concepts.

Referring to FIG. 18, an integrated circuit design system 180 may include a user device 181, an integrated circuit design platform 182, and a storage device 183. The integrated circuit design system 180 may perform, for example, an integrated circuit design operation including operations S110 and S130 of FIG. 1. At least one of the user device 181, the integrated circuit design platform 182, and the storage device 183 may be an independent device, and the user device 181, the integrated circuit design platform 182, and the storage device 183 may be connected through wired/wireless communication or network. In some embodiments, at least one of the user device 181, the integrated circuit design platform 182, and the storage device 183 may be located apart from each other.

The user device 181 may include a processor 181a and a user interface (UI) 181b. According to user input received through the UI 181b, the processor 181a may drive the integrated circuit design platform 182. The integrated circuit design platform 182 may be a set of computer-readable instructions for designing an integrated circuit and may include a synthesis module 182a and a P&R module 182b. The storage device 183 may include a cell library DB 183a and a layout DB 183b. The cell library DB 183a may store information on a cell that is required to generate a layout of an integrated circuit, and the layout DB 183b may store information about a layout generated by a P&R module 182b, specifically, physical information about the layout.

Figure 19:
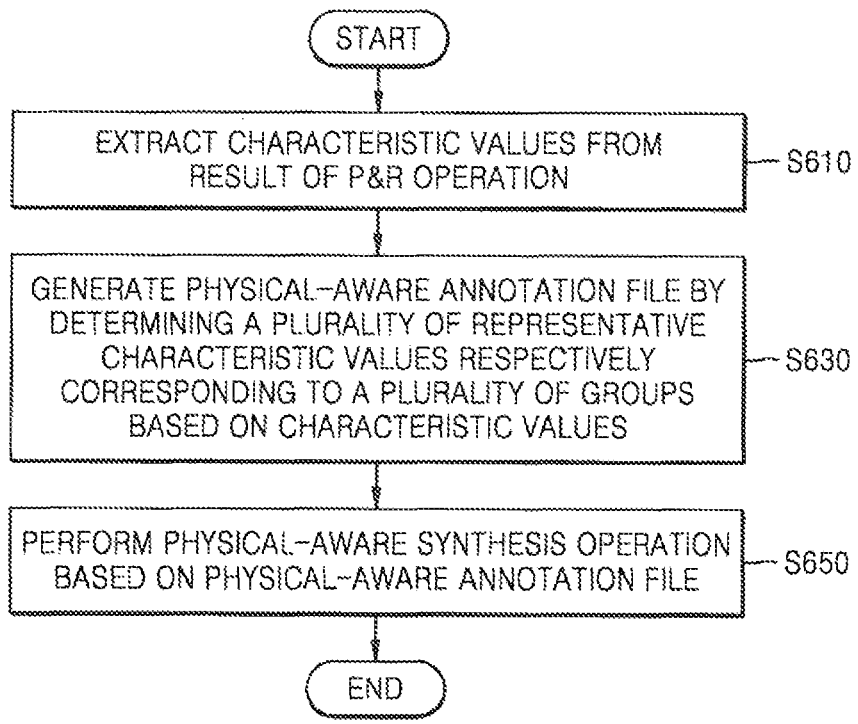
FIG. 19 is a flowchart illustrating operations of methods of designing integrated circuits according to some embodiments of the inventive concepts.

FIG. 19 is a flowchart illustrating operations of methods of designing integrated circuits according to some embodiments of the inventive concepts.

Referring to FIG. 19, a method of designing an integrated circuit may be a computer implemented method of designing an integrated circuit by considering BEOL. For example, the computer implemented method of designing tire integrated circuit may include operations S610 to S650 that may be performed in a time-series manner in the integrated circuit design system 160 of FIG. 16. Thus, operations S610 to S650 may be performed by a processor (e.g., the processor 161 of FIG. 16). Descriptions provided with reference to FIGS. 1 to 18 may apply to the embodiments of FIG. 19, and thus, repetitive descriptions may be omitted.

In operation S610, characteristic values may be extracted from a result of a P&R operation for standard cells defining an integrated circuit. In some embodiments, characteristic values may Include at least one of clock latency information and parasitic component information. In some embodiments, clock latency information on each of a plurality of clock pins may be extracted from a result of the P&R operation as characteristic values. For example, the clock latency information may include the maximum clock latency and the minimum clock latency on each clock pin.

In some embodiments, parasitic information including at least of parasitic resistance and parasitic capacitance of each of a plurality of signal nets may be extracted from a result of a P&R operation as characteristic values. In detail, first parasitic components may be estimated based on a global routing result of the P&R operation, and second parasitic components may be extracted from a detail routing result of the P&R operation. The first and second parasitic components may be compared with each other to generate parasitic scaling factors.

In operation S630, a plurality of representative characteristic values respectively corresponding to a plurality of groups may be determined based on the extracted characteristic values and thus, a physical-aware annotation file may be generated. In some embodiments, logic modules included in an integrated circuit may be grouped into a plurality of groups, an average of clock latencies of each of the groups may be determined as a representative characteristic value corresponding to the each of the groups.

In some embodiments, a plurality of signal nets may be grouped into a plurality of groups, representative parasitic scaling factors corresponding to each of the groups may be determined based on the generated parasitic scaling factors. For example, a plurality of signal nets may be grouped into a plurality of groups based, on at least one of the number of FO pins, a length of a net, a direct connection stats between a net and an IO cell and a direct connection status between a net and a macro cell.

In operation. S650, based on the generated physical-aware annotation file, a physical-aware synthesis operation may be performed to generate a netlist from input data for an integrated circuit. In some embodiments, a reference clock latency corresponding to an average of all clock latencies may be applied to a plurality of clock pins included in an integrated circuit, and a representative characteristic value corresponding to each group may be further applied to clock pins included in logic modules of the each group.

Figure 20:
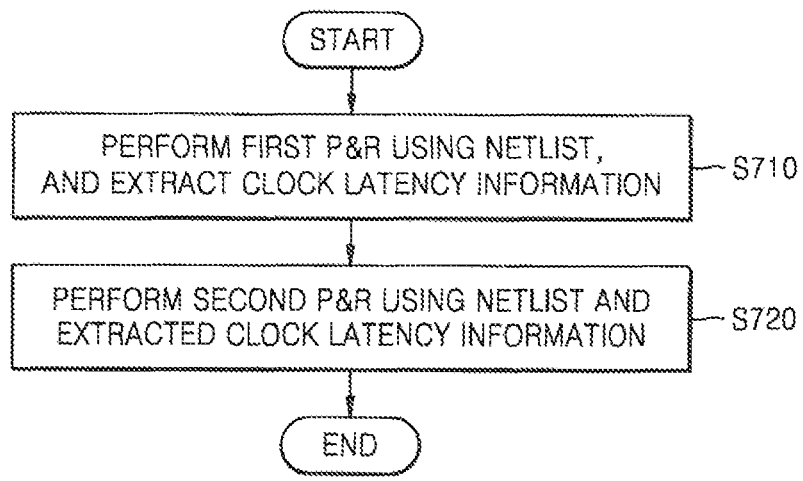
FIG. 20 is a flowchart illustrating operations of methods of designing integrated circuits according to some embodiments of the inventive concepts.

FIG. 20 is a flowchart illustrating operations of methods of designing integrated circuits according to some embodiments of the inventive concepts.

Referring to FIG. 20, a method of designing an integrated circuit may be a method, which is performed by a computer, of designing an integrated circuit considering BEOL. For example, the method of designing the integrated circuit may include operations S710 and S720 that may be performed. In time-series manner in the integrated circuit design system 160 of FIG. 16. Thus, operations S710 and S720 may be performed by a processor (e.g., the processor 161 of FIG. 16). Descriptions with reference to FIGS. 1 to 19 may also be applied to the embodiments of FIG. 20 and thus, repetitive descriptions may be omitted.

In operation S710, a first P&R may be performed using a netlist for an integrated circuit, and clock latency information may be extracted from a result of the first P&R operation. For example, the first P&R may correspond to the ith P&R operation 71 of FIG. 7B.

In operation S720, a second P&R may be performed using the netlist for the integrated circuit and the extracted clock latency information. For example, the second P&R may correspond to the i+1th P&R operation 73 of FIG. 7B. In some embodiments, the second P&R may include an operation of placing a plurality of standard cells that define the integrated circuit using the extracted clock latency information.

A synthesis operation may not be performed between operation S710 and operation S720. Thus, a netlist used in operation S710 and a netlist used in operation S720 may be identical. In this regard, the clock latency information extracted from operation S710 may not be applied to a netlist used in operation S720.

Figure 21:
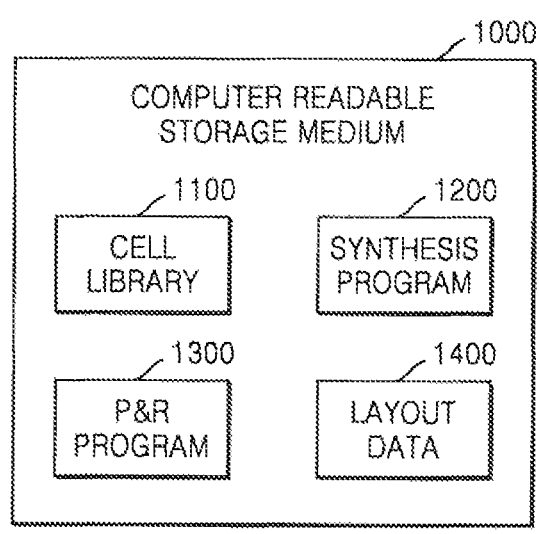
FIG. 21 is a block diagram illustrating a non-transitory computer-readable storage medium according to some embodiments of the inventive concepts.

FIG. 21 is a block diagram illustrating a non-transitory computer-readable storage medium according to some embodiments of the inventive concepts.

Referring to FIG. 21, a storage medium 1000 may include a cell library 1100, a synthesis program 1200, a P&R program 1300, and layout data 1400. The storage medium 1000 may be a non-transitory computer-readable storage medium and may include an arbitrary storage medium that may be read by a computer while providing instructions and/or data to the computer. For example, the non-transitory computer-readable storage medium 1000 may include a magnetic or optical medium such as disc, tape, CD-ROM, DVD-ROM, CD-R, CD-RW, DVD-R, and DVD-RW, a volatile or nonvolatile memory such as RAM, ROM, and flash memory, a nonvolatile memory accessible through a USB interface, and microelectromechanical systems (MEMS). The non-transitory computer-readable storage medium may be inserted into a computer, may be integrated in a computer, and may be coupled to a computer through a communication medium, such, as a network and/or a wireless link.

The cell library 1100 may be a standard cell library and may include information on a standard cell which is a unit for configuring an integrated circuit In some embodiments, the information on the standard cell may include layout information that is required to generate a layout. In some embodiments, the information on the standard cell may include timing information that is required for layout verification or simulation. The layout data 1400 may include physical Information on a layout generated in a P&R operation. For example, the layout data 1400 may include a width value and a space value of conductive patterns configuring a signal net.

The synthesis program 1200 may include, according to exemplary embodiments of the inventive concepts, a plurality of instructions for performing a physical-aware synthesis operation to generate a netlist from an RTL code about an integrated circuit, using characteristic values extracted from a result of the previous P&R operation, representative characteristic values, or physical-aware annotation files. The synthesis program 1200 may be used, for example, to perform operation S110 of FIG. 1, the ith synthesis operation S210 and the i+1th synthesis operation S230 of FIG. 2, the physical-aware synthesis operation S320 of FIG. 3, the i+1th synthesis operation 72 of FIG. 7A, the i+1th synthesis operation 72' of FIG. 9, the physical-aware synthesis operation S420 of FIG. 10, the i+1th synthesis operation 112 of FIG. 11, the i+1th synthesis operation 112' of FIG. 14, the physical-aware synthesis operation S520 of FIG. 15, or the operation S650 of FIG. 19.

The P&R program 1300 may include a plurality of instructions for performing a method of generating a layout of an integrated circuit using a standard cell library according to exemplary embodiments. The P&R program 1300 may be used to perform, for example, operation S130 of FIG. 1, the i+1th synthesis operation S230 and the i+1th P&R operation S240 of FIG. 2, the P&R operation S310 of FIG. 3, the ith P&R operation 71 and the i+1th P&R operation 73 of FIG. 7A, the ith P&R operation 71 and the i+1th P&R operation 73 of FIG. 7B, the P&R operation S410 of FIG. 10, the i+1th synthesis operation 112 of FIG. 11, the P&R operation S510 of FIG. 15, operations S610 and S630 of FIG. 19, or operations S710 and S720 of FIG. 20.

While the inventive concepts have been particularly shown and described with reference to embodiments thereof, it will be understood that various changes in form and details may be made therein without departing from the spirit and scope of the following claims.

What is claimed is:

1. A computer implemented method of designing an integrated circuit including logic modules, the method performed by a processor and comprising:
    performing a placement and routing (P&R) operation for standard cells defining the integrated circuit;
    extracting characteristic values from a result of the P&R operation;
    generating a physical-aware annotation file by determining a plurality of representative characteristic values that respectively correspond to a plurality of groups of the logic modules based on the extracted characteristic values; and
    performing a physical-aware synthesis operation to generate a netlist from input data for the integrated circuit based on the generated physical-aware annotation file,
    wherein the generating of the physical-aware annotation file comprises:
        grouping the logic modules included in the integrated circuit into the plurality of groups; and
        determining clock latency average values, respectively corresponding to the plurality of groups, as the plurality of representative characteristic values, respectively corresponding to the plurality of groups.

2. The computer implemented method of claim 1, wherein the extracting of the characteristic values from the result of the P&R operation comprises extracting clock latency information with respect to ones of a plurality of clock pins from the result of the P&R operation as the characteristic values.

3. The computer implemented method of claim 2, wherein the clock latency information comprises a maximum clock latency and a minimum clock latency with respect to the ones of the plurality of clock pins.

4. The computer implemented method of claim 2, wherein the performing of the physical-aware synthesis operation comprises:
    applying, to the plurality of clock pins included in the integrated circuit, a reference clock latency corresponding to an average value of all clock latencies; and
    further applying, to clock pins included in the logic modules of each of the plurality of groups, a representative characteristic value corresponding to the ones of the plurality of groups.

5. The computer implemented method of claim 2, wherein the performing of the P&R operation for the standard cells defining the integrated circuit is based on the netlist and the clock latency information.

6. The computer implemented method of claim 5, wherein the performing of the P&R operation comprises:
    placing the standard cells based on the netlist and the clock latency information;
    after placing the standard cells, removing the clock latency information;

after removing the clock latency information, performing a clock tree synthesis operation with respect to a result of the placing; and performing a routing operation with respect to a result of the clock tree synthesis operation.

7. The computer implemented method of claim 1, wherein the extracting of the characteristic values further comprises extracting parasitic component information, including information about at least one of parasitic resistance and a parasitic capacitance, on each of a plurality of signal nets from the result of the P&R operation.

8. The computer implemented method of claim 7, wherein the extracting of the characteristic values further comprises:

estimating first parasitic components from a result of a global routing of the P&R operation;

extracting second parasitic components from a result of a detail routing of the P&R operation; and generating parasitic scaling factors by comparing the first parasitic components with the second parasitic components.

9. The computer implemented method of claim 8, wherein the generating of the physical-aware annotation file further comprises:

grouping the plurality of signal nets into the plurality of groups; and determining representative parasitic scaling factors that respectively correspond to the plurality of groups, based on the generated parasitic scaling factors.

10. The computer implemented method of claim 9, wherein the grouping of the plurality of signal nets into the plurality of groups is based on at least one of a number of fanout pins, a length of a net, a direct connection status between a net and an Input/Output (I/O) cell, and a direct connection status between a net and a macro cell.

11. A computer implemented method of designing an integrated circuit, the method performed by a processor and comprising:

performing a first placement and routing (P&R) operation to place a first plurality of standard cells defining the integrated circuit;

grouping logic modules of the integrated circuit into a plurality of groups;

extracting clock latency information from a result of the first P&R operation; and performing a second P&R operation to place a second plurality of standard cells defining the integrated circuit based on the clock latency information, wherein the clock latency information comprises a plurality of clock latency average values that respectively correspond to the plurality of groups of the logic modules.

12. The computer implemented method of claim 11, wherein the first P&R operation is based on a first netlist for the integrated circuit, wherein the method further comprises performing a physical-aware synthesis operation to generate a second netlist based on the clock latency information, and wherein the second P&R operation is based on the second netlist.

13. The computer implemented method of claim 11, wherein the first P&R operation and the second P&R operation are each based on a first netlist for the integrated circuit.

14. The computer implemented method of claim 11, wherein the first P&R operation comprises performing a first placement operation, performing a first post route optimization operation, and extracting the clock latency information from the first post route optimization operation.

15. The computer implemented method of claim 14, wherein the second P&R operation comprises:

performing a second placement operation based on the clock latency information extracted from the first post route optimization operation;

performing a clock-tree synthesis operation; and performing a second post route optimization operation.

* * * * *